(12) United States Patent
Boyd et al.

(10) Patent No.: US 10,698,138 B2
(45) Date of Patent: Jun. 30, 2020

(54) GRADED DIFFUSER

(71) Applicant: 3M INNOVATIVE PROPERTIES COMPANY, St. Paul, MN (US)

(72) Inventors: Gary T. Boyd, Woodbury, MN (US); Tri D. Pham, Woodbury, MN (US); Nicholas A. Johnson, Burnsville, MN (US); Oanh V. Pham, Maplewood, MN (US); Sara S. Merritt, Grant, MN (US); Stephen J. Etzkorn, Woodbury, MN (US); Haiyan Zhang, Lake Elmo, MN (US); Corey D. Balts, Eau Claire, WI (US); Joseph T. Aronson, Menomonie, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 239 days.

(21) Appl. No.: 15/568,832

(22) PCT Filed: Apr. 14, 2016

(86) PCT No.: PCT/US2016/027427
§ 371 (c)(1),
(2) Date: Oct. 24, 2017

(87) PCT Pub. No.: WO2016/171981
PCT Pub. Date: Oct. 27, 2016

(65) Prior Publication Data
US 2018/0217300 A1    Aug. 2, 2018

Related U.S. Application Data

(60) Provisional application No. 62/152,503, filed on Apr. 24, 2015.

(51) Int. Cl.
*G02B 5/02* (2006.01)
*G02B 13/20* (2006.01)
(Continued)

(52) U.S. Cl.
CPC ............ *G02B 5/0221* (2013.01); *C25D 3/04* (2013.01); *C25D 3/38* (2013.01); *C25D 5/12* (2013.01);
(Continued)

(58) Field of Classification Search
CPC .. G02B 5/0221; G02B 6/0076; G02B 5/0284; G02B 5/0278; G02B 5/0268; G02B 5/04;
(Continued)

(56) References Cited

U.S. PATENT DOCUMENTS

| 6,733,147 B2 | 5/2004 | Wang |
| 6,846,098 B2 | 1/2005 | Bourdelais |

(Continued)

FOREIGN PATENT DOCUMENTS

| JP | 10170919 | 6/1998 |
| JP | 2002-323607 | 11/2002 |

(Continued)

OTHER PUBLICATIONS

International Search Report for PCT International Application No. PCT/US2016/027427, dated Jul. 28, 2016, 3 pages.

*Primary Examiner* — Mustak Choudhury
(74) *Attorney, Agent, or Firm* — Clifton F. Richardson

(57) ABSTRACT

A diffuser including opposing structured first and second major surfaces is described. The first major surface includes a first plurality of surface structures providing a uniform first haze. The second major surface includes a first portion adjacent an edge and a second portion adjacent the first portion. The first portion includes a first region and a second region between the first region and the second portion. The second major surface includes a second plurality of surface structures providing a uniform second haze over the second portion and providing a third haze in the first portion. The third haze in the first region is higher than the second haze, (Continued)

and the third haze in the second region is monotonically decreasing. The second portion has a surface area of at least 90 percent of a surface area of the second major surface.

19 Claims, 16 Drawing Sheets

(51) Int. Cl.
 F21V 8/00 (2006.01)
 G02B 3/00 (2006.01)
 G02B 1/14 (2015.01)
 C25D 3/04 (2006.01)
 C25D 3/38 (2006.01)
 C25D 5/12 (2006.01)
 G02F 1/13357 (2006.01)
 G02B 5/04 (2006.01)

(52) U.S. Cl.
 CPC ............ G02B 1/14 (2015.01); G02B 3/005 (2013.01); G02B 3/0062 (2013.01); G02B 5/0242 (2013.01); G02B 5/0263 (2013.01); G02B 5/0268 (2013.01); G02B 5/0278 (2013.01); G02B 5/0284 (2013.01); G02B 6/0051 (2013.01); G02B 6/0061 (2013.01); G02B 6/0076 (2013.01); G02F 1/133603 (2013.01); G02F 1/133606 (2013.01); G02B 5/04 (2013.01); G02B 6/0053 (2013.01); G02F 2001/133607 (2013.01)

(58) Field of Classification Search
 CPC .. G02B 5/0263; G02B 6/0061; G02B 6/0051; G02B 6/0053; G02B 5/0226; G02B 5/0231; G02B 5/0242; G02B 5/0257; G02B 5/02; G02B 6/0026; G02B 6/0038; G02B 6/0041; G02B 6/0065; G02B 6/0068; G02F 1/133606; G02F 1/133603; G02F 2001/133607; C25D 5/12; C25D 3/38; C25D 3/04
 USPC ........... 359/831, 707, 615, 599, 536, 489.11, 359/485.01, 315; 349/62, 64, 84, 96, 349/112, 193; 362/97.1, 326–336, 558, 362/619

See application file for complete search history.

(56) References Cited

U.S. PATENT DOCUMENTS

| 8,657,472 | B2 | 2/2014 | Aronson | |
|---|---|---|---|---|
| 8,888,333 | B2 | 11/2014 | Yapel | |
| 2003/0214719 | A1* | 11/2003 | Bourdelais | G02B 5/0221 359/599 |
| 2004/0160673 | A1 | 8/2004 | Se et al. | |
| 2005/0105186 | A1 | 5/2005 | Kaminsky et al. | |
| 2005/0135115 | A1 | 6/2005 | Lamb | |
| 2005/0140860 | A1 | 6/2005 | Olczak | |
| 2005/0280752 | A1 | 12/2005 | Kim et al. | |
| 2006/0098288 | A1 | 5/2006 | Pan | |
| 2006/0290253 | A1* | 12/2006 | Yeo | G02B 5/0226 313/116 |
| 2008/0013338 | A1 | 1/2008 | Huang | |
| 2009/0201571 | A1* | 8/2009 | Gally | G02B 6/0041 359/315 |
| 2010/0302479 | A1 | 12/2010 | Aronson | |
| 2011/0051053 | A1 | 3/2011 | Okamura | |
| 2012/0064296 | A1 | 3/2012 | Walker, Jr. | |
| 2012/0147593 | A1* | 6/2012 | Yapel | G02B 5/0221 362/97.1 |
| 2012/0268964 | A1 | 10/2012 | Bastawros et al. | |
| 2013/0004728 | A1 | 1/2013 | Boyd | |
| 2014/0055985 | A1 | 2/2014 | Zhang | |
| 2018/0003364 | A1 | 1/2018 | Wheatley et al. | |

FOREIGN PATENT DOCUMENTS

| JP | 2004-253335 | 9/2004 |
|---|---|---|
| JP | 2006-172815 | 6/2006 |
| JP | 2010-015129 | 1/2010 |
| JP | 2010-510544 | 4/2010 |
| JP | 2011-014412 | 1/2011 |
| JP | 2012-190582 | 10/2012 |
| JP | 2015-537250 | 12/2015 |
| JP | 2016-071953 | 5/2016 |
| WO | WO 2008-144644 | 11/2008 |
| WO | WO 2014-081693 | 5/2014 |
| WO | WO 2016-172428 | 10/2016 |

* cited by examiner

GRADED DIFFUSER

BACKGROUND

Backlights used in liquid crystal displays (LCDs) can include a light guide and a plurality of light emitting diodes (LEDs) that inject light into an input edge of the light guide. A diffuser can be incorporated in the display between the light guide and a LCD panel. Objectionable lighting intensity variation near the input edge of the backlight can sometimes be seen in the display.

SUMMARY

In some aspects of the present description, a diffuser including opposing first and second major surfaces and an edge extending between the first and second major surfaces is provided. The first major surface includes a first plurality of surface structures providing a substantially uniform first haze, the second major surface includes a first portion adjacent the edge and a second portion adjacent the first portion opposite the edge. The first portion includes a first region adjacent the edge and a second region between the first region and the second portion. The second major surface includes a second plurality of surface structures providing a substantially uniform second haze over the second portion of the second major surface and providing a third haze in the first portion of the second major surface. The third haze is substantially equal to the second haze along a continuous boundary between the first and second portions of the second major surface. The third haze in the first region is higher than the second haze, and the third haze in the second region monotonically decreases with a distance along a direction from the edge towards the continuous boundary. The second portion has a surface area of at least 90 percent of a surface area of the second major surface.

In some aspects of the present description, a method of making a diffuser is provided. The method includes providing a first microreplication tool having a first structured surface, providing a substrate having opposing first and second major surfaces, using the first microreplication tool to structure the first major surface of the substrate, providing a second microreplication tool having a second structured surface, and using the second microreplication tool to structure the second major surface of the substrate. The first structured surface has a substantially uniform distribution of surface structures. The second structured surface has a distribution of surface structures that varies in a region of the second structured surface and is substantially uniform over a second portion of the second structured surface. The second portion has a surface area of at least 90 percent of a surface area of the second structured surface. The step of providing the first microreplication tool includes forming a first layer of a metal by electrodepositing the metal using a first electroplating process resulting in a first major surface of the first layer having a first average roughness, and forming a second layer of the metal on the first major surface of the first layer by electrodepositing the metal on the first major surface using a second electroplating process resulting in a second major surface of the second layer having a second average roughness smaller than the first average roughness. The step of providing the second microreplication tool includes using a cutting system to cut structures into a surface of a pre-formed tool.

In some aspects of the present description, an optical stack including an optical film and an optical diffuser substantially coextensive with the optical film is provided. The optical film includes a structured top surface including a plurality of substantially parallel top structures extending linearly along a first direction; and a structured bottom surface including a plurality of substantially parallel bottom structures extending linearly along a second direction different from the first direction, each top and bottom structure comprising opposing first and second curved faces extending from respective opposite first and second ends of a base of the structure and meeting at a peak of the structure. The optical diffuser includes a structured top surface facing the structured bottom surface of the optical film and having a substantially uniform first optical haze across the structured top surface; and a structured bottom surface having a first portion along a first edge of the structured bottom surface and a second portion extending from the first portion to an opposite second edge of the structured bottom surface, the second portion having a substantially uniform second optical haze across the second portion, at least some regions in the first portion having a third optical haze no less than the first optical haze, the second optical haze being less than the first optical haze.

In some aspects of the present description, a backlight including a light source, a lightguide having an input surface proximate the light source and an output surface, an optical diffuser disposed on the lightguide, and an optical film disposed on the optical diffuser is provided. The optical diffuser includes a structured top surface having a substantially uniform first optical haze across the structured top surface; and a structured bottom surface facing the output surface of the lightguide and having a first portion along a first edge of the structured bottom surface proximate the input surface of the lightguide and a second portion extending from the first portion to an opposite second edge of the structured bottom surface, the second portion having a substantially uniform second optical haze across the second portion, at least some regions in the first portion having a third optical haze no less than the first optical haze, the second optical haze being different from the first optical haze. The optical film includes a first structured surface including a plurality of substantially linear parallel first structures facing the structured top surface of the optical diffuser; a second structured surface comprising a plurality of substantially linear parallel second structures facing away from the structured top surface of the optical diffuser, each first and second structure comprising opposing curved first and second faces, the curved first and second faces having different axes of curvature.

DETAILED DESCRIPTION

In the following description, reference is made to the accompanying drawings that forms a part hereof and in which are shown by way of illustration. The drawings are not necessarily to scale. It is to be understood that other embodiments are contemplated and may be made without departing from the scope or spirit of the present disclosure. The following detailed description, therefore, is not to be taken in a limiting sense.

Backlights used in transmissive displays, such as liquid crystal displays (LCDs), often include a light guide and a light source, which may include a plurality of light emitting diodes (LEDs), disposed to inject light into an input edge of the light guide. The light guide typically includes extraction features disposed such that light is extracted through an output surface of the light guide. A diffuser can be placed between the light guide and the display panel in order to improve the uniformity of the light output from the display. However, to eliminate hot spots (regions of relatively high intensity surrounded by regions of lower intensity) a high degree of haze is typically needed, and a diffuser having a uniform high haze can undesirably reduce the brightness of the display. This may be addressed by using a diffuser having a varying haze with a high haze near the injection edge and a lower haze away from the injection edge. This can, however, lead to undesired visible artifacts associated with the varying haze.

According to the present description, it has been discovered that combining the effects of two separate diffusing surfaces of a diffuser film with only one of the two surfaces exhibiting a variable haze can provide a high, uniform brightness without the unwanted optical artifacts that can arise from a varying haze. In some embodiments, optical diffusers according to the present description have a first surface providing a substantially uniform haze and have an opposing second surface having a haze which varies near an input edge and is substantially uniform away from the input edge. In some embodiments, a display is provided that incorporates the diffuser film with the second surface facing an output surface of a light guide. The second surface of the diffuser can also provide an anti-wetout (AWO) function so that optical artifacts are not created when the diffuser is placed immediately adjacent the light guide. The structures of the second surface of the diffuser may provide a more robust anti-wetout function than conventional AWO layers since the structures of the second major surface may be larger and/or more densely arranged than conventional AWO layers in order to provide a desired level of haze.

Figure 1A:
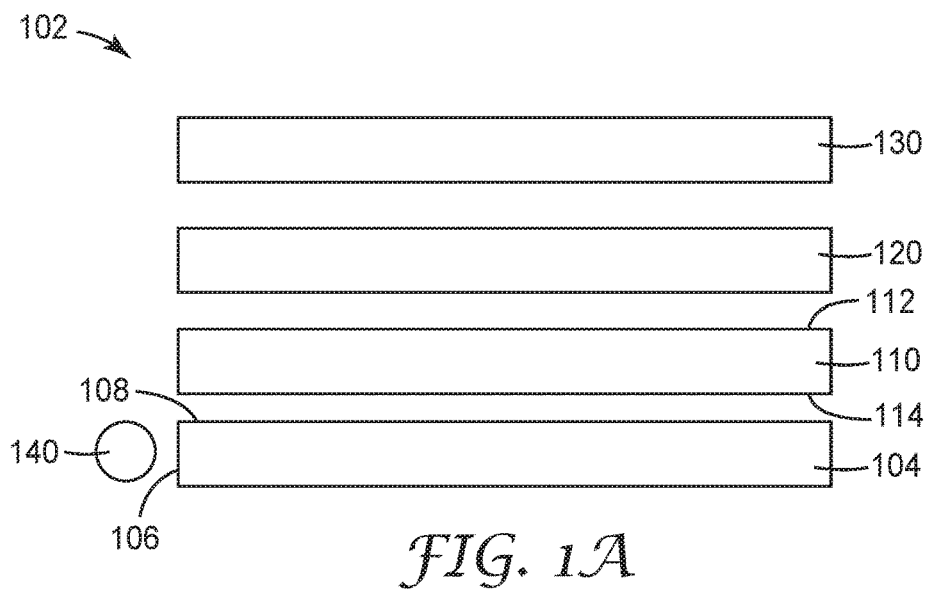
FIG. 1A is a schematic side view of a display including a diffuser.
Figure 1B:
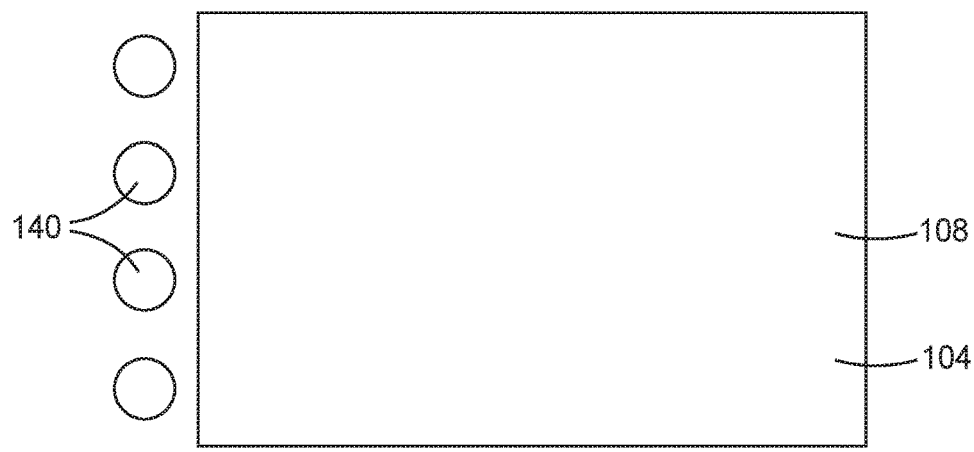
FIG. 1B is a schematic top view of a light guide and light sources of the display of FIG. 1A.

FIG. 1A is a schematic side view a display 102 that includes a light guide 104 having an input edge 106 and an output surface 108, a diffuser 110 disposed adjacent the output surface 108 with a first major surface 112 facing away from the output surface 108 and an opposite second major surface 114 facing output surface 108, optical films 120 disposed adjacent diffuser 110 opposite light guide 104, display panel 130 disposed adjacent optical films 120 opposite diffuser 110, and light sources 140 disposed adjacent input edge 106. Optical films 120 may be Brightness Enhancement Films (BEFs) such as crossed prism films, for example. Diffuser 110 may be any of the diffusers described herein. FIG. 1B is a schematic top view of a portion of the display 102 that includes light sources 140 and light guide 104 having output surface 108. In the illustrated embodiment, a plurality of light sources 140 are included. Without a suitable diffuser 110 placed between light guide 104 and display panel 130, hot spots may be visible in regions near each of the light sources 140. An air gap may separate diffuser 110 and light guide 104 and an air gap may separate diffuser 110 and optical films 120.

Optical films 120 may also include a turning film or recycling film adjacent the diffuser 110. Suitable turning films or recycling films include those described in U.S. Prov. App. No. 62/152,486, entitled "OPTICAL FILM" filed on an even date herewith and hereby incorporated herein by reference to the extent that it does not contradict the present description. Such optical films are described further elsewhere herein.

Figure 2A:
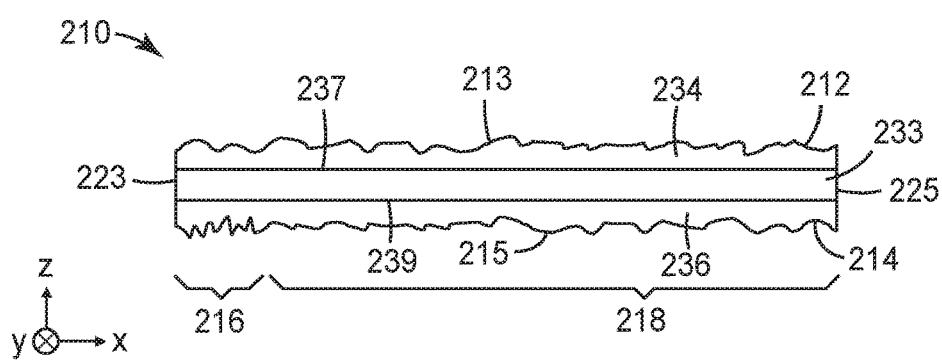
FIG. 2A is a side view of a diffuser.

FIG. 2A is a side view of diffuser 210 which include a first major surface 212, an opposing second major surface 214, a first edge 223 extending between first and second major surfaces 212 and 214, and an opposing second edge 225. Second major surface 214 includes a first portion 216 adjacent the first edge 223 and a second portion 218 adjacent first portion 216. First major surface 212 includes a first plurality of surface structures 213 which provide a substantially uniform first haze. Second major surface 214 includes a second plurality of surface structures 215 which provide a substantially uniform second haze over a second portion 218 of the second major surface 214 and a third haze in the first portion 216 of the second major surface 214. The third haze may be substantially constant in a first region 216a (see FIG. 2B) of the first portion 216 closest the first edge 223 and may be monotonically decreasing in a second region 216b (see FIG. 2B) of the first portion 216.

Figure 2B:
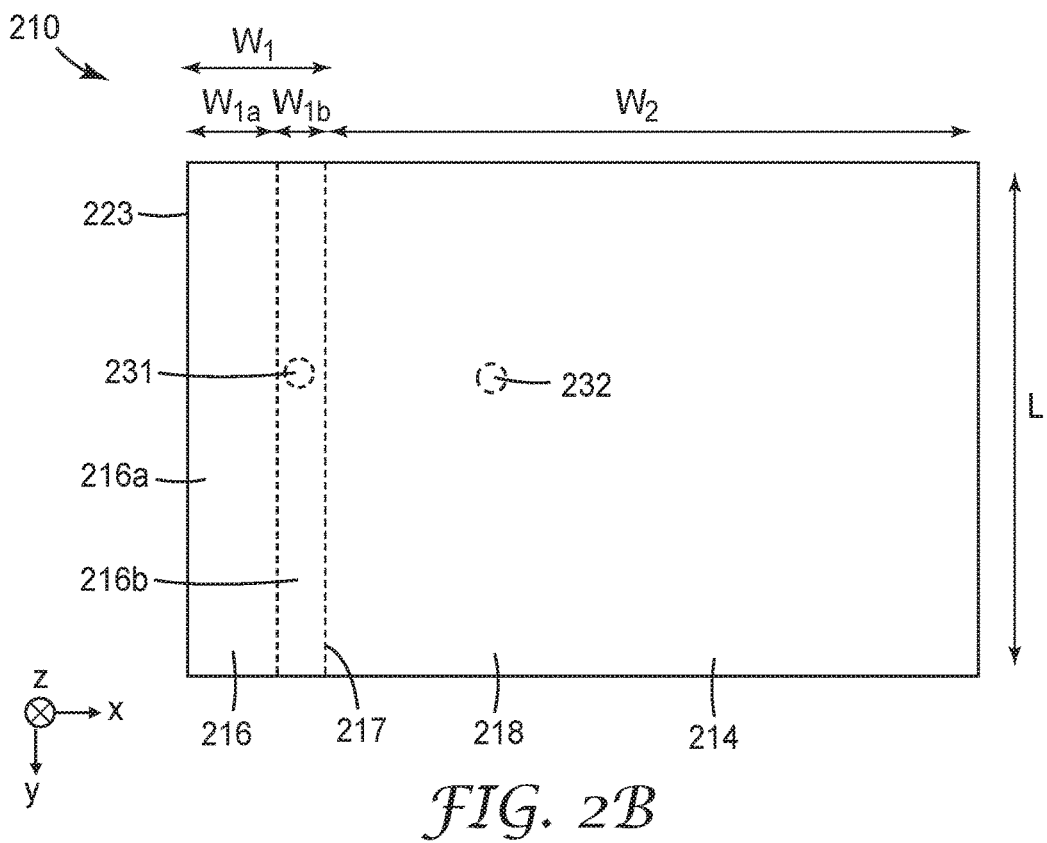
FIGS. 2B-2C are a schematic bottom views of the diffuser of FIG. 2A.
Figure 2C:
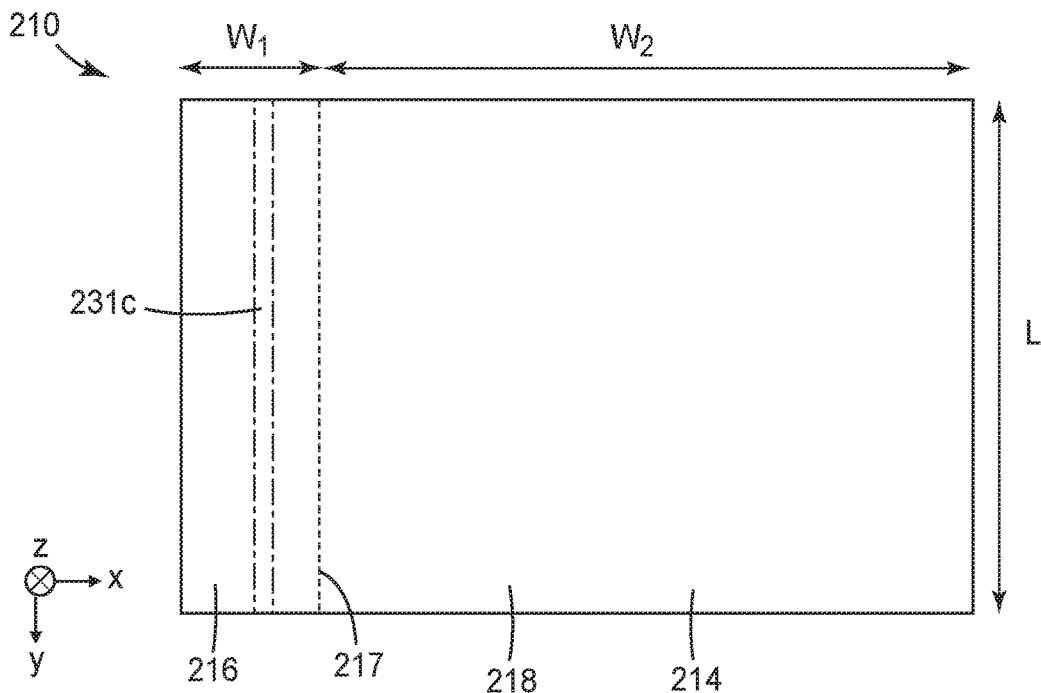

The structured first and second major surfaces 212 and 214 extend generally along orthogonal in-plane directions, which can be used to define a local Cartesian x-y-z coordinate system as indicated in FIGS. 2A-2C. A reference plane of the diffuser 210 extends in the x and y directions and a thickness of the diffuser 210 is along the z direction. The x-direction may be described as a direction from the first edge 223 towards the continuous boundary 217 (see FIG. 2B) and the y-direction may be described as an in-plane direction orthogonal to the x-direction. The y-direction may also be described as a direction along the edge 223 and the x-direction may be described as the in-plane direction orthogonal to the y-direction.

In the embodiment illustrated in FIG. 2A, surface structures 213 are formed in a first layer 234 disposed on a major surface of a substrate layer 233 and surface structures 215 are formed in a second layer 236 disposed on a major surface of substrate layer 233 opposite first layer 234. Substrate layer 233 includes opposing major surfaces 237 and 239. One or both of first layer 234 and second layer 236 may be formed by a cast and cure process where a curable resin is cast against a tool (e.g., a microreplication tool) and cured. Curing of the material used to form the first and/or second layers 234 and 236 can be carried out with ultraviolet (UV) radiation, with heat, or in any other known way. Alternatively, diffuser 210 may be a unitary layer with surface structures 213 and 215 formed directly on outer major surfaces of the unitary layer. In this case, the structured first and second major surfaces can be formed by embossing a thermoplastic substrate with sufficient heat and pressure, for example.

Typically, the layer or layers that make up the diffuser are highly transmissive to light, at least to light over a majority of the visible spectrum. Such layer or layers thus typically have a low absorption for such light. Exemplary materials for use as a carrier film or substrate layer 233 include light-transmissive polymers such as polyacrylates and polymethacrylates, polycarbonate, polyethylene terephthalate, polyethylene naphthalate, polystyrene, cyclo olefin polymers, and co-polymers or combinations of these polymer classes. Exemplary materials for use as a patterned first or second layer 234 or 236 include light transmissive polymers such as acrylate and epoxy resins. However, other polymer materials, as well as non-polymer materials, may also be used. The layer or layers may have any suitable index of refraction, for example in a range from 1.4 to 1.8, or from 1.5 to 1.8, or from 1.5 to 1.7, but values outside this range can also be used. The index of refraction may be specified at 550 nm, or at another suitable design wavelength, or it may be an average over the visible wavelength range. The index of refraction may be specified at 25° C.

FIG. 2B is a schematic bottom view of diffuser 210 showing first and second portions 216 and 218 of second major surface 214 and showing continuous boundary 217 between the first and second portions 216 and 218 of the second major surface 214. First portion 216 includes a first region 216a having a width $W_{1a}$ and a second region 216b having a width $W_{1b}$. First portion 216 is adjacent edge 223, second portion 218 is adjacent first portion 216 opposite edge 223, first region 216a is adjacent first edge 223, and second region 216b is between the first region 216a and the second portion 218. First and second portions 216 and 218 may extend across the length L of the diffuser 210 or may extend across at least 90 percent of the length L of the diffuser. First and second regions 216a and 216b may extend across the length L of the diffuser 210 or may extend across at least 90 percent of the length of the diffuser. First region 216a may be immediately adjacent edge 223, second region 216b may be immediately adjacent first region 216a, and second portion 218 may be immediately adjacent second region 216b. The first portion 216 has a width $W_1=W_{1a}+W_{1b}$ and the second portion 218 has a width $W_2$. It has been found that having a third haze that is higher than the second haze in the first region 216a of the first portion 216, that is monotonically decreasing with the distance from the first edge 223 (i.e., monotonically decreasing with x) in the second region 216b of the first portion, and that is substantially equal to the second haze along the continuous boundary 217 between the first and second portions 216 and 218 of the second major surface 214, can substantially reduce hot spots associated with light sources adjacent an input edge of a light guide while not producing optical artifacts associated with a varying haze. In some embodiments, the width $W_2$ of the second portion is at least 90 percent of the width $W_1+W_2$ of the diffuser. In some embodiments, $W_1$ divided by $W_2$ is less than 0.9 or less than 0.95. In some embodiments, $W_1$ is greater than 1 mm, or greater than 2 mm, or greater than 3 mm, or greater than 5 mm, or greater than 1 cm. In some embodiments, one or both of $W_{1a}$ and $W_{1b}$ is greater than 0.5 mm, or greater than 1 mm, or greater than 2 mm, or greater than 3 mm, or greater than 5 mm, or greater than 1 cm.

The haze of the first and second major surfaces 212 and 214 can be described in terms of an underlying distribution of amplitudes (e.g., heights), spacings, lateral dimensions (e.g., diameter) and/or slopes of the surface structures 213 and 215. These distributions can be determined in regions that are small compared to a length scale on which the distributions vary but that is large compared to a size of the surface structures 213 and 215. For example, the distributions can be determined in area 231 of the first portion 216 and in area 232 of the second portion 218. Area 231 may be in the first region 216a, in the second region 216b, or may span the first and second regions 216a and 216b. Area 231 or area 232 may be a circular region with a diameter 1, 2, 3, 4, or 5 times the average equivalent circular diameter ($ECD_{avg}$), which is described further elsewhere herein, of the structures in area 231. Alternatively, area 231 or 232 may be a circular region with a fixed diameter of 100 micrometers, or 1 mm, or 2 mm, or 3 mm, or 5 mm, for example. The haze or clarity of an area of a surface, such as area 231 or area 232, can be determined using a haze meter as described further elsewhere herein. In some embodiments, at least one of the distributions of amplitudes, spacings or slopes of the surface structures 215 varies with position (e.g., the x position) of area 231 in the second region 216b of the first portion 216. In some embodiments, at least one of the distributions of amplitudes, spacings or slopes of the surface structures 215 varies with the y position of area 231 in the first region 216a of the first portion 216. In some embodiments, each of the distributions of amplitudes, spacings and slopes of the surface structures 215 does not vary with position of area 232 in the second portion 218. Similarly, in some embodiments each of the distributions of amplitudes, spacings and slopes of the surface structures 213 does not vary with position on the first major surface 212. In some embodiments, each of the distributions of amplitudes, spacings and slopes of the surface structures 215 does not vary with the x-position of area 231 in the first region 216a of the first portion 216. In some embodiments, the distributions of amplitudes, spacings and slopes of the surface structures 215 does not vary with the y-coordinate. In such embodiments, the haze may be determined in an area that extends in the y-coordinate. This is illustrated in FIG. 2C where area 231c may be a strip having a width of 1 mm, 2 mm or 3 mm, for example.

In some embodiments, the distribution of slopes is characterizable by surface angle distributions as described further elsewhere herein. The surface angle distributions may be characterizable by a half width at half maximum (HWHM) in each of two orthogonal directions (e.g., x and y directions). In some embodiments, at least one region in the first portion 216 (e.g., area 231 or 231c) of the second major surface 214 or in the second portion 218 (e.g., area 232) of the second major surface 214 has a first surface angle distribution having a first half width at half maximum (HWHM) in a first direction (e.g., the x direction) and a second surface angle distribution having a second HWHM in a second direction (e.g., the y-direction) different from the first direction. In some embodiments, the first HWHM is different from the second HWHM. In some embodiments, the first HWHM at any region of the second major surface 214 is different from the second HWHM in that region. Each of the first and second HWHM may be less than about 15 degrees, or less than about 10 degrees, or less than about 6 degrees and may be in a range of about 1 degree to about 6 degrees, or to about 10 degrees, or to about 15 degrees, for example. The first and second HWHM may differ by at least 1 degree or at least 2 degrees, for example.

In some embodiments, the second portion 218 has a surface area of at least 90 percent, or at least 95 percent, or at least 99 percent of a surface are of the second major surface 214. In some embodiments, the second portion 218 does not extend to second edge 225. Instead, there may be a third portion adjacent second edge 225 that includes a second varying haze. The second varying haze of the third portion may be similar to the varying haze of first portion 216. This type of diffuser may be useful in backlights which are edge lit from opposite sides. Similarly, the diffuser may have third and fourth edges extending between the first and second edges 223 and 225 and there may be fourth and/or fifth portions adjacent the third and/or fourth edges, respectively, where the haze may vary.

Figure 11:
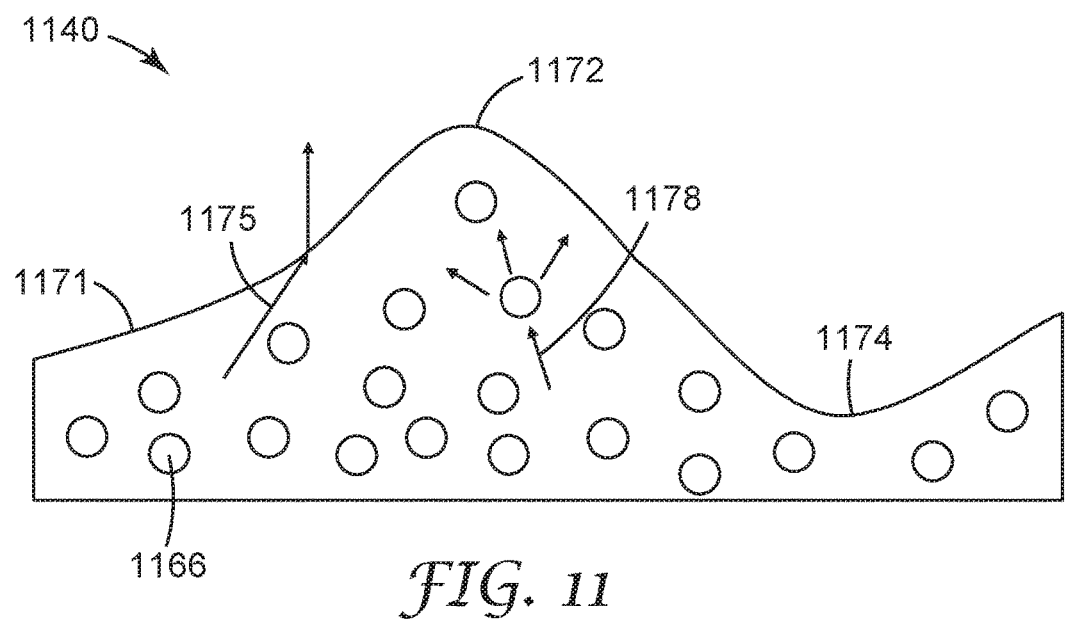
FIG. 11 is a schematic side-view of a portion of a structured layer.

FIG. 11 is a cross-sectional view of a structured layer 1140 including light scattering particles 1166 and having a structured surface 1171 which includes a peak 1172 and a valley 1174. Light ray 1175 has a direction which changes due to refraction as the light ray 1175 exits through structured surface 1171. Since the geometry of structured surface 1171 varies point to point, the shift in direction of light exiting through structured surface 1171 varies from point to point. This variable shift in direction produces a surface contribution to the haze of the layer 1140. The particles 1166 also contribute to the haze of the layer 1140. For example, light ray 1178 is scattered by one or more of the particles 1166 thereby contributing to the haze. Since there are more particles 1166 under peak 1172 than under valley 1174, light passing through peak 1172 will tend to scatter more than light passing through valley 1174. Surface structures in a structured layer can therefore provide a haze both by producing a contribution to the haze through refraction at an air interface with the structured surface and by producing scattering due to particles included within the structures.

The haze or clarity provided by a layer of a diffuser having a structured surface can be determined by reproducing the layer on a low haze substrate (e.g., a haze of less than 1 percent, or less than 0.5 percent) and measuring the haze or clarity through the reproduced layer and the substrate using a haze meter as described elsewhere herein. For example, a sample having the first layer 234 or the second layer 236 reproduced on an optically clear substrate can be prepared and the haze or clarity through the sample can be measured. Alternatively, the haze or clarity provided by a layer of a diffuser having a structured surface can be determined by measuring the topography of the surface (for example, by using confocal scanning laser microscopy (CSLM) or atomic force microscopy (AFM)), measuring the refractive index of the layer and of any light scattering particles that might be included in the layer and using conventional ray tracing techniques to calculate the contribution of the surface structures to the haze or clarity.

In some embodiments, the diffuser may be free or substantially free of light scattering particles or beads. In such embodiments, the haze provided by a given surface can be measured by coating the opposite surface with a material having a refractive index matching the refractive index of the material of the opposite surface. The overall haze measured through the sample with the given surface facing the light source of the haze meter is then the haze provided by the given surface. The clarity of the given surface can also be determined using this refractive index matching technique.

Haze, or optical haze, can be measured as described in ASTM D1003-13 "Standard Test Method for Haze and Luminous Transmittance of Transparent Plastics". Haze can be determined using a HAZE-GARD PLUS meter available from BYK-Gardner Inc. (Silver Springs, Md.) which is cited in the ASTM D1003-13 standard. Related to haze is clarity, or optical clarity, which can also be measured according to the ASTM D1003-13 standard by using the HAZE-GARD PLUS haze meter.

As specified in the ASTM D1003-13 standard, the HAZE-GARD PLUS haze meter includes an aperture between a collimated light source and an integrating sphere used to measure light from the light source that is scattered by a sample. Haze or clarity in an area of a structured layer can be measured using the HAZE-GARD PLUS haze meter with a cover sheet having a cutout in the shape of the area to be measured placed over the aperture with the center of the cutout area aligned with the center of the aperture. The cover sheet blocks light from regions outside the area from entering the integrating sphere and so the haze or clarity only of the area of the sample covering the cutout area is determined. For example, a cover sheet that blocks light everywhere except for a 2 mm slit can be placed over the aperture and the haze meter can then be used to determine the haze of the sample placed adjacent the aperture. The resulting haze reading will then be the haze of the area of the sample in front of the 2 mm slit. A 2 mm slit is useful for measuring the haze of samples that are uniform in the y-direction, for example. Other cutout shapes may also be used. For example a circular cutout having a diameter of 2 mm may be used or a cutout having an area corresponding to any of the geometries described elsewhere herein for areas 231, 232 or 231c may be used. The haze of a layer having a structured surface may be determined with the structured surface facing the collimated light source. When a diffuser has a first surface providing a substantially uniform haze and a second surface providing a haze that is not uniform over the entire second surface, the overall haze of the diffuser may be determined with the first structured surface facing the light source or with the surface providing the higher haze facing the light source.

When used in a display, diffuser 210 may be disposed proximate a light guide with the second major surface 214 facing an output major surface of the light guide and with first edge 223 adjacent an input edge of the light guide. The first haze, which is the substantially uniform haze associated with first major surface 212, may be greater than the second haze, which is the substantially uniform haze associated with the second portion 218 of the second major surface 214. The first haze may be greater than the second haze by at least about 2 percent, at least about 5 percent, at least about 10 percent, or at least about 15 percent, or at least about 20 percent. For example, if the first haze is 50 percent and the second haze is 10 percent, the first haze is greater than the second haze by 40 percent. In some embodiments the maximum of the third haze associated with the first portion 216 of the second major surface 214 is greater than the first haze. For example, the third haze may be greater than the first haze by at least about 2 percent, at least about 5 percent, at least about 10 percent, or at least about 15 percent, or at least about 20 percent.

FIG. 3 illustrates the haze distribution of a diffuser of the present description. The first major surface of the diffuser provides a first haze 351 which is substantially uniform and has the value $H_1$. The second major surface of the diffuser provides a second haze 352 in second portion 318 (corresponding to second portion 218) and a third haze 353 in first portion 316 (corresponding to first portion 216). The third haze 353 in first region 316a (corresponding to first region 216a) of first portion 316 is larger than the second haze 352 in the second portion 318 and is larger than the first haze 351 provided by the first major surface. The third haze 353 in second region 316b is monotonically decreasing with distance along a direction from the first edge towards the boundary between the first and second portions 316 and 318 (i.e., monotonically decreasing with the x coordinate). The diffuser has an overall haze 354 provided by the combination of the structured first and second major surfaces (e.g., first and second major surfaces 212 and 214). The overall haze 354 can vary with position due to the contribution from third haze 353. In some embodiments, light scattering particles included in a substrate (e.g., substrate 233) provides an additional contribution to the overall haze. Note that the overall haze may not be a simple linear sum of contributions from the first and second surfaces. The second haze 352 of the second major surface in the second portion 318 is about $H_2$ and the third haze 353 of the second major surface in the first portion 316 has a maximum value of $H_m$. In the illustrated embodiment, $$H_m > H_1 > H_2.$$

This arrangement of haze values has been found to be particularly advantageous for providing a high brightness output while reducing hotspot visibility without adding unwanted optical artifacts due to a varying haze. In some embodiments, $H_m$-$H_1$ is at least about 2 percent, or at least about 5 percent, or at least about 10 percent and/or $H_1$-$H_2$ is at least about 2 percent, or at least about 5 percent, or at least about 10 percent. In some embodiments, $H_m$ is at least 50 percent, or at least 60 percent, or at least 70 percent. In some embodiments, $H_1$ is in a range from about 10 percent, or about 15 percent to about 50 percent, or to about 60 percent, or to about 70 percent, or to about 80 percent, or to about 90 percent, or to about 95 percent, or to about 100 percent. In some embodiments, $H_1$ is greater than about 50 percent, or greater than about 60 percent, or greater than about 70 percent. In some embodiments, the first major surface has an optical clarity in a range from about 1 percent, or about 2 percent, or about 3 percent, to about 30 percent, or to about 40 percent. In some embodiments, $H_2$ is in a range from about 0.5 percent, or about 1 percent, or about 2 percent to about 15 percent, or about 18 percent, or about 20 percent, or about 40 percent, or about 50 percent, or about 70 percent, or about 90 percent, or about 95 percent. In some embodiments, the second major surface has an optical clarity not greater than about 85% in all portions and regions of the second major surface. In some embodiments, the first portion or the second portion of the second major surface may have an optical clarity that is greater than 1 percent, or greater than 2 percent, or greater than 3 percent, and may be less than 50 percent, or less than 60 percent, or less than 90 percent, or less than 100 percent. In some embodiments, the second portion of the second major surface may have an optical clarity in a range of about 5 percent to about 100 percent and the first major surface may have an optical clarity in a range of about 3 percent to about 20 percent.

Figure 3A:
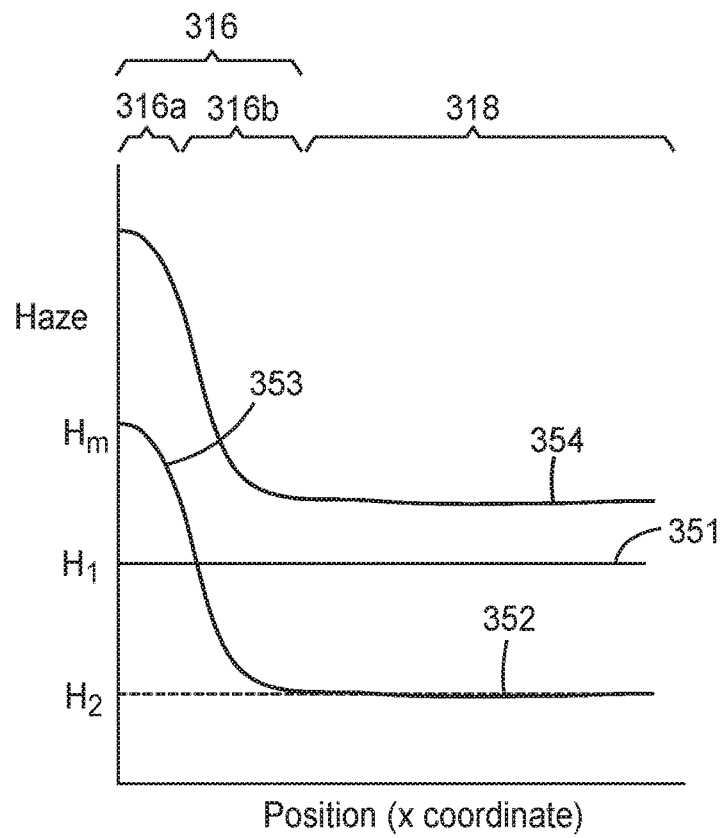
FIGS. 3A-3D are graphs showing haze as a function of position.
Figure 3B:
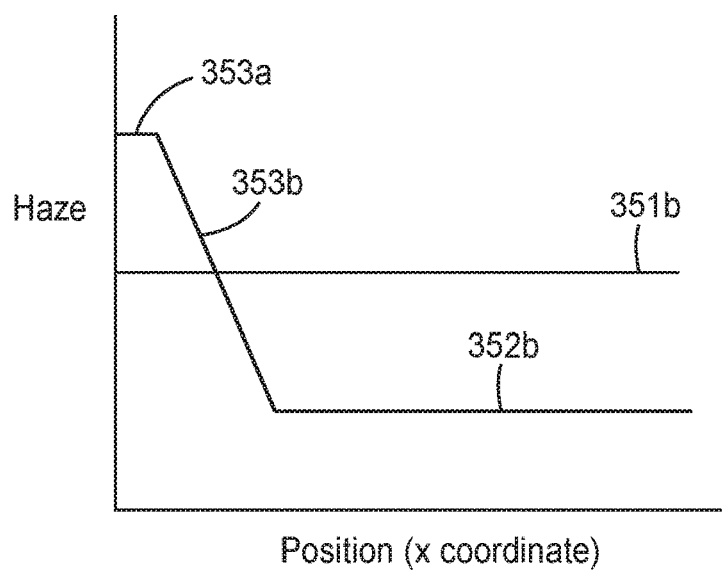

An alternate haze distribution is shown in FIG. 3B. The first major surface provides a substantially constant first haze 351b, the second portion of the second major surface provides a substantially constant second haze 352b, and the first portion of the second major surface provides a third haze which takes a substantially constant value 353a in the first region of the first portion and has a monotonically decreasing value 353b in the second region of the second portion of the second major surface.

In any of the embodiments described herein, the third haze in the second region of the first portion of the second major surface may monotonically decrease linearly as illustrated in FIG. 3B, or the monotonically decreasing haze may be described by polynomial functions, or piece-wise polynomial functions, of the x-coordinate. The polynomial functions may splines, which may be cubic splines. Nonlinear functions, such as cubic splines, have been found to produce reduced optical artifacts compared to a simple linear decrease.

Figure 3C:
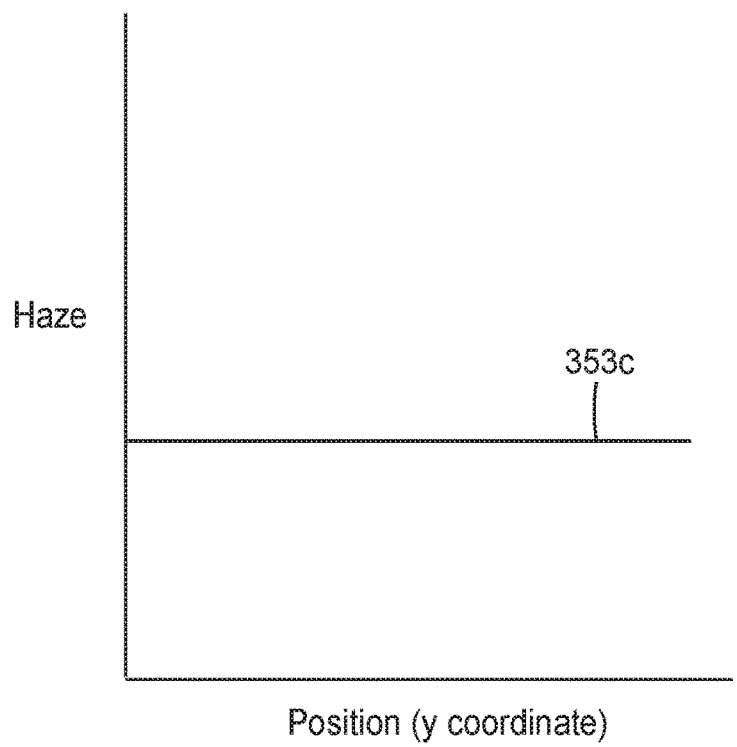
Figure 3D:
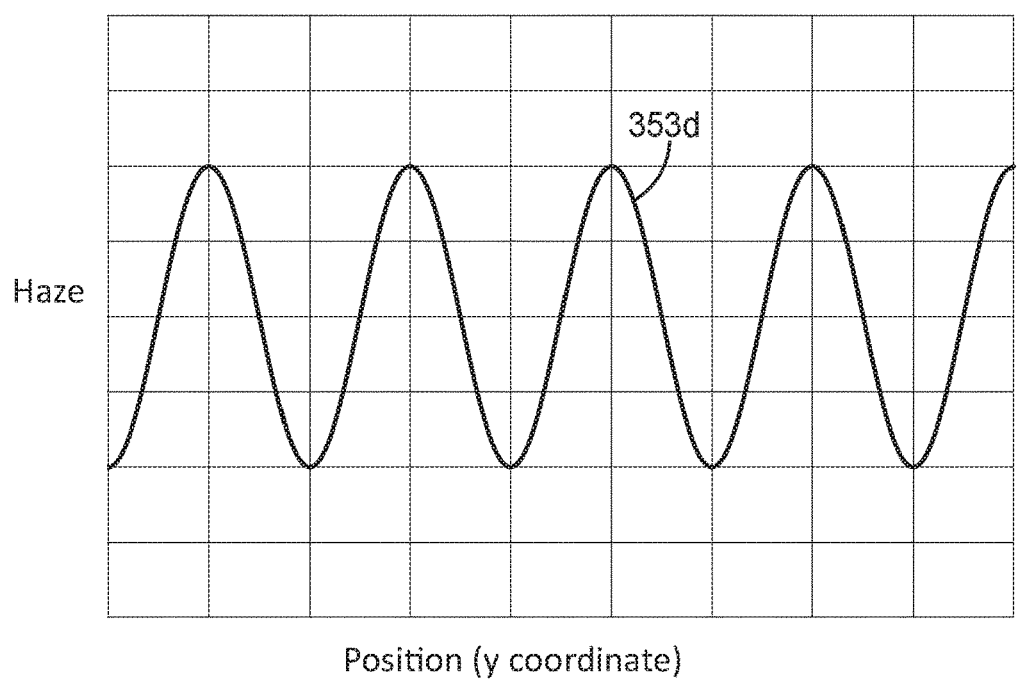

The haze of the first portion 216 may or may not depend on the y-coordinate. FIGS. 3C and 3D show the third haze 353c and 353d, respectively, as a function of the y-coordinate for a fixed x-coordinate in the first portion 216. The x-coordinate may be in either the first or second regions 216a or 216b. The third haze 353c is independent of the y-coordinate, while the third haze 353d varies periodically with the y-coordinate. The third haze may be periodically modulated commensurate with LEDs included in an edge lit display, for example, to provide improved uniformity. The highest haze regions may be in the regions where hot spots could occur. The hot spot regions may be offset from the locations of the LEDs because of the configurations of extractors used in the backlight. In some cases, it may be desirable to place the highest haze regions between the LEDs since the extractors can produce hot spots in locations between the LEDs.

In some embodiments, the overall haze of the diffuser varies smoothly throughout the diffuser so that optical artifacts resulting from an abrupt change in haze are not produced. However, it may be desired that the haze change significantly on the length scale of the width $W_{1b}$ of the second region 216b of the first portion 216 of the second major surface 214. Although this length scale is small (e.g., less than 10 percent of an overall width ($W_1+W_2$) of the diffuser), the haze may vary on the scale of the width $W_{1b}$ substantially without undesired optical artifacts if the first major surface of the diffuser has a uniform haze which can mask any artifacts that might be produced by the varying haze of the second major surface. In order to simultaneously avoid optical artifacts due to rapidly varying haze and to have the haze change significantly on the length scale of the width $W_{1b}$, it may be desired for the haze to change gradually on a length scale that is greater than the wavelength of light, or greater than a pixel size, or greater the an average equivalent circular diameter ($ECD_{avg}$), which is described further elsewhere herein. In some embodiments, this is achieve by choosing a sufficiently large $W_{1b}$. For example, $W_{1b}$ may be greater than about 0.5 mm, or greater than about 1 mm, or greater than about 2 mm, or greater than about 3 mm, or greater than about 5 mm.

A haze may be said to vary continuously or substantially continuously if there are no abrupt transitions in the haze. For example, the third haze in the first portion 216 may be said to vary substantially continuously if there are no abrupt changes in the third haze with the position on the second major surface. A haze may be said to change abruptly if a first haze value at a first position is different from a second haze value at a second position by more than 10 percent when the first and second positions are within 0.1 mm of each other. In some embodiments, the third haze does not exhibit any abrupt changes in the first portion 216. In some embodiments, a difference in magnitude between the third haze at a first position and the third haze at a second position for each pair of first and second positions separated by no more than 0.1 mm, or separated by no more than 0.5 mm, is less than 20 percent, or less than 10 percent.

Any type of structured surface that produces a desired haze distribution may be used. Examples include prisms or prism-like structures, where the prisms may be randomly deformed or unevenly spaced; random or irregular structures which may be unevenly spaced and may be elongated in one direction to some extent; and other random or irregular structures that may be limited in size along two orthogonal in-plane directions.

The structured second major surface may be prepared, for example, by printing layer 236 on side 239 of substrate 233. A pattern with a gradient can be printed to produce a desired gradient in the haze. The printing may be done, for example, using offset printing or ink jet printing. A clear resin or a beaded resin may be printed to form layer 236. For example, a UV curable acrylic resin with or without glass or polymeric beads may be used. The printed pattern may be in the form of small dots or lenselets having a gradient in height, spacing and/or diameter or lateral dimension. Alternatively, the structured second major surface can be prepared by casting and curing against a replication tool having a pattern with a gradient in height, spacing, lateral dimension, and/or slope distribution.

It has been found that it is particularly advantageous for the first major surface 212 to have surface structures formed as generally described in WO 2014/081693 (Pham et al.) and/or for the second major surface 214 to have surface structures formed as generally described in U.S. Pat. No. 8,657,472 (Aronson et al.) or U.S. Pat. No. 8,888,333 (Yapel et al.), though in some cases it may be desired for the haze of the second major surface to be greater than those of the surfaces of U.S. Pat. No. 8,657,472 (Aronson et al.) or U.S. Pat. No. 8,888,333 (Yapel et al.). Each of WO 2014/081693 (Pham et al.), U.S. Pat. No. 8,657,472 (Aronson et al.), and U.S. Pat. No. 8,888,333 (Yapel et al.) are hereby incorporated by reference herein to the extent that they do not contradict the present description. Structures formed according to WO 2014/081693 (Pham et al.) provide useful degrees of haze and optical clarity while structures formed according to U.S. Pat. No. 8,657,472 (Aronson et al.) or U.S. Pat. No. 8,888,333 (Yapel et al.) also provide useful degrees of haze and optical clarity while also providing an anti-wetout function which prevents optical defects when placed immediately adjacent a light guide in a display. As discussed further elsewhere herein, the tooling used to make the structures of U.S. Pat. No. 8,657,472 (Aronson et al.) or U.S. Pat. No. 8,888,333 (Yapel et al.) can be adapted to provide a continuously varying haze in the first portion 216 of the second major surface 214. The quantities, such as ECD or slope magnitude distributions, used in the description of one of the first and second major surfaces may also be used in describing the other major surface.

When forming the first major surface as described in WO 2014/081693 (Pham et al.) and the second major surface as described in U.S. Pat. No. 8,657,472 (Aronson et al.) or U.S. Pat. No. 8,888,333 (Yapel et al.), it may be desired to have the first major surface have a higher haze (first haze) than the second portion of the second major surface (second haze). This is for at least two reasons. First, if the second haze were increased, it may be desired to lower the first haze in order to produce a desired overall haze and it takes more time and cost to use the plating process of WO 2014/081693 (Pham et al.) to make a lower haze surface. Second, the diffuser may be configured to be placed in a display with the first major surface facing an output direction of the display. In such configuration, a structured first major surface having a high haze can contribute to a high on-axis luminance of the display by providing a recycling effect. Furthermore, a relatively high first haze can help mask any artifacts that might be produced by the varying haze in the first portion of second major surface.

The topography of the structured first or second major surfaces 212 and 214 can be expressed in terms of deviations along a thickness direction (z-axis), relative to a reference plane (the x-y plane) lying parallel to the structured first and second major surfaces 212 and 214. In many cases, the topography of a structured surface is such that distinct individual structures can be identified. Such structures may be in the form of protrusions, which are made from corresponding cavities in the structured surface tool, or cavities, which are made from corresponding protrusions in the structured surface tool. The structures are typically limited in size along two orthogonal in-plane directions. For example, when the structured first major surface 212 or the structured second major surface 214 is seen in plan view, individual structures do not typically extend indefinitely in a linear fashion along any in-plane direction. Whether protrusions or cavities, the structures may also in some cases be closely packed, i.e., arranged such that at least portions of boundaries of many or most adjacent structures substantially meet or coincide. The structures may also be irregularly or non-uniformly dispersed on the structured surface. In some cases, some, most, or substantially all (e.g., >90%, or >95%, or >99%) of the structures may be curved or comprise a rounded or otherwise curved base surface. In some cases, at least some of the structures may be pyramidal in shape or otherwise defined by substantially flat facets. The size of a given structure may be expressed in terms of an equivalent circular diameter (ECD) in plan view, and the structures of a structured surface may have an average ECD of less than 15 micrometers, or less than 10 micrometers, or in a range from 4 to 10 micrometers or 4 to 15 micrometers, for example. The structured surface and structures can also be characterized with other parameters as discussed elsewhere herein, e.g., by an aspect ratio of the depth or height to a characteristic transverse dimension such as ECD, or the total length of ridges on the surface per unit area in plan view. The optical haze, optical clarity, and other characteristics of the diffuser can be provided without the use of any beads at or on the structured surfaces, or elsewhere within the diffuser.

Figure 4:
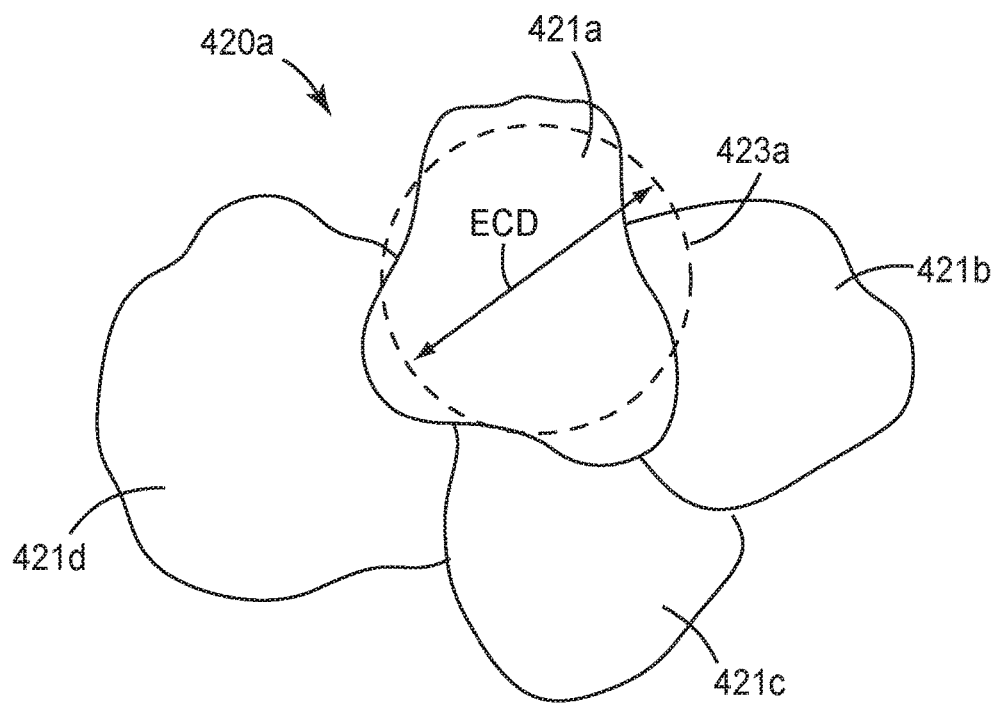
FIG. 4 a schematic plan view of a portion of a structured surface.

For a structured surface in which distinct individual structures can be identified, the structured surface can be described in terms of a characteristic size, such as a transverse or in-plane dimension, of the structures. Each structure may for example be characterized as having a largest transverse dimension, a smallest transverse dimension, and an average transverse dimension. If the individual structures are limited in size along two orthogonal in-plane directions, e.g., not extending indefinitely in a linear fashion along any in-plane direction, each structure may be characterized as having an equivalent circular diameter "ECD". The ECD of a given structure may be defined as the diameter of a circle whose area in plan view is the same as the area in plan view of the structure. For example, with reference to FIG. 4, a plan view of a hypothetical structured surface 420a is shown. The structured surface comprises distinguishable structures 421a, 421b, 421c, 421d, which may be protrusions or cavities. A circle 423a is superimposed on the structure 421a, the circle having in this plan view an area approximately equal to that of the structure 421a. The diameter (ECD) of the circle 423a is the equivalent circular diameter (ECD) of the structure 421a. By averaging the ECD values for all of the structures in a representative region of the structured surface, the structured surface or structures thereof may then be said to have an average equivalent circular diameter $ECD_{avg}$.

Figure 5:
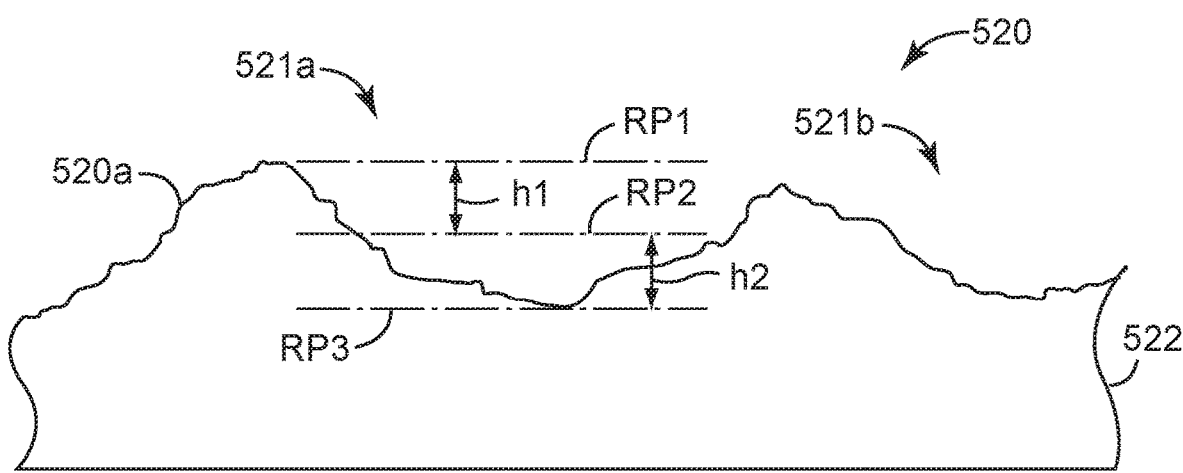
FIG. 5 is a schematic side or sectional view of a portion of a structured surface.

The height of an exemplary structure is illustrated in the drawing of a hypothetical structured surface in FIG. 5. In the figure, an optical diffusing film 520 includes a patterned layer 522 with a structured major surface 520a. The structured surface 520a includes discernible individual structures 521a, 521b. The structured surface extends along or defines an x-y plane. Three reference planes parallel to the x-y plane are shown: RP1, RP2, and RP3. The reference planes RP1, RP3 may be defined in terms of the highest and lowest portions (respectively) of the structure 521a. The reference plane RP2 may be located at a position corresponding to zero or near-zero curvature, i.e., the surface at that position is neither curved inwardly, as at the top of a peak, nor curved outwardly, as at the bottom of a cavity. Given these reference planes, a height h1 between RP1 and RP2, and a height h2 between RP2 and RP3 can be defined. The mean height of the structure can be defined as the average of |h1| plus |h2|. In some embodiments, the first structured surface includes closely-packed structures that are characterized by equivalent circular diameters (ECDs) in a reference plane (e.g., reference plane RP2) and mean heights along a thickness direction, and an aspect ratio of each structure equals the mean height of the structure divided by the ECD of the structure. In some embodiments, an average aspect ratio of the structures is less than 0.15, or less than 0.10. In some embodiments, an average aspect ratio of the structures is in a range of 0.01 to 0.15.

Figure 6:
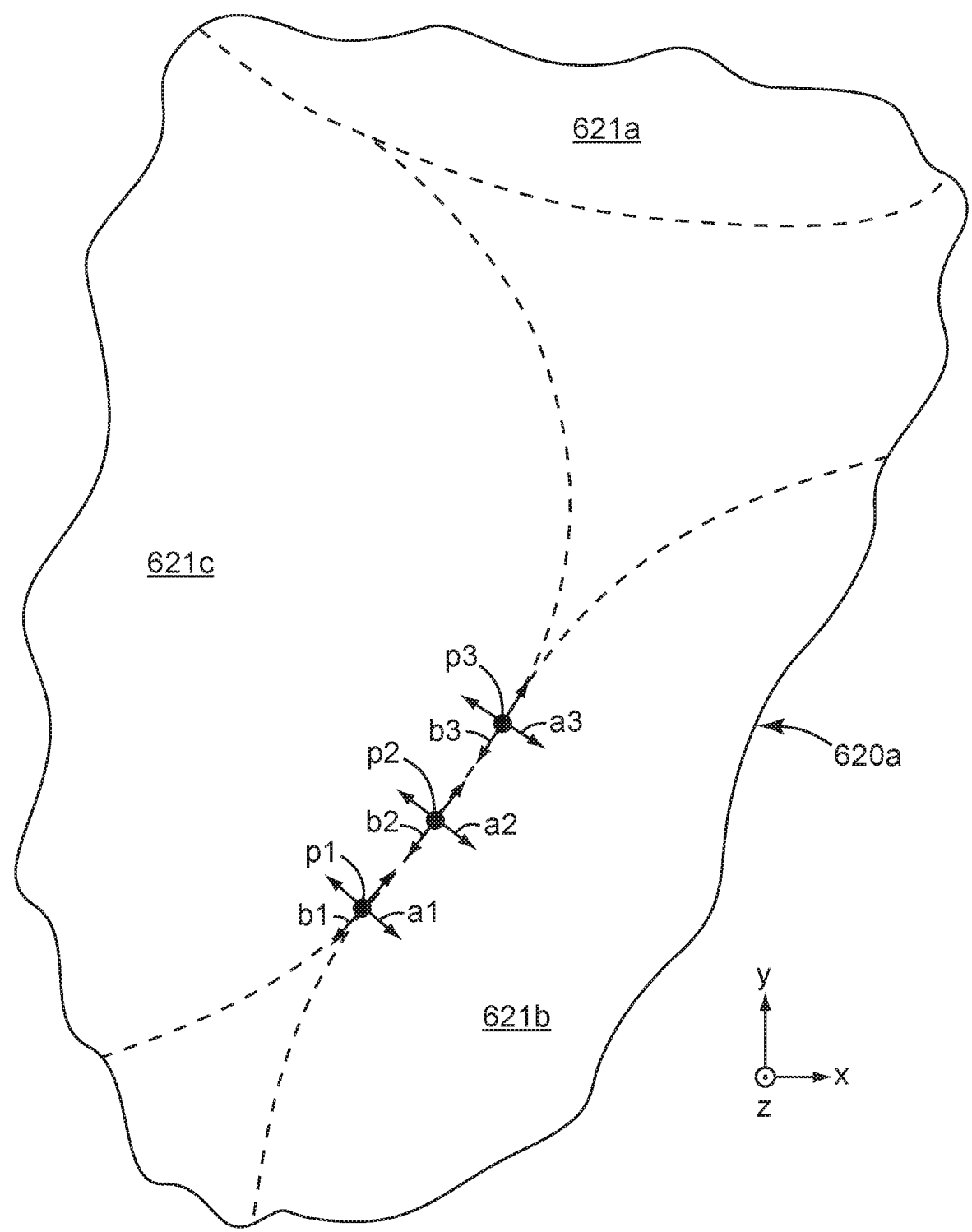
FIG. 6 is a schematic plan view of a portion of a structured surface.

In some embodiments, the closely packed structures tend to produce ridge-like features, although ridge-like features may also occur in the absence of closely packed structures. A ridge is illustrated in the drawing of a hypothetical structured surface in FIG. 6. In the figure, an optical diffusing film includes a structured major surface 620a. The structured surface 620a includes discernible individual structures 621a, 621b, 621c. The structured surface extends along or defines an x-y plane. A ridge, which may be described as a long, sharp, peaked region, is formed along at least a short segment at which the boundaries of the structures 621a, 621b come together. The ridge or segment includes points p1, p2, p3. The local slope and curvature at each of these points, based on the known topography, can be calculated along directions (see axes a1, a2, a3) that are parallel to a gradient and perpendicular to the ridge, as well as along directions (see axes b1, b2, b3) that are perpendicular to the gradient and parallel to the ridge. Such curvatures and slopes can be used to confirm that the points lie on a long, sharp peaked region. For example, points on the ridge may be identified by: a sufficiently different curvature along the two perpendicular directions (e.g. a1, b1); a sharp curvature perpendicular to the ridge (e.g. a1); a slope in the gradient direction (e.g. along the ridge, see b1) that is less than the average slope; and a segment length that is sufficiently long.

The structured first and/or second major surface may be characterized by a total ridge length per unit area in plan view of less than 200 mm/mm$^2$, or less than 150 mm/mm$^2$, or in a range from 10 to 200 mm/mm$^2$, or 10 to 150 mm/mm$^2$.

The ridge length per area of a sample can be determined as described in WO 2014/081693 (Pham et al.). In this technique, for a given diffuser sample, a ~1×1 cm piece of the sample is cut from the central portion of the sample. The sample piece is mounted on a microscope slide, and its structured surface that is to be characterized is Au—Pd sputter-coated. Two height profiles of the structured surface is obtained using confocal scanning laser microscopy (CSLM). Whenever possible, fields of view are chosen to give a good sampling of the topography. Ridge analysis is used to analyze the height profiles in accordance with the principles described elsewhere herein.

The ridge analysis identifies the peaks of ridges on a 2D height map and allows the total length of ridges per unit sample area to be calculated. Curvature along the gradient direction and transverse to the gradient direction can be calculated about each pixel. Thresholding on the curvature and slope can be carried out to identify ridges.

The following is the definition of a ridge that may be used in the ridge analysis.

1. Curvature definitions: (a) gcurvature is the curvature along the gradient direction; (b) tcurvature is the curvature along the direction transverse (perpendicular) to the gradient direction; (c) gcurvature is calculated by using three points along the gradient and calculating the circle that circumscribes the three points; the gcurvature=1/R, where R is the radius of this circle; (d) tcurvature is calculated by using three points along the direction transverse to the gradient and calculating the circle that circumscribes the three points; the gcurvature=1/R, where R is the radius of this circle; (e) the curvature is assigned to the center point of these three points; (f) the spacing of the three points is chosen to be large enough to reduce the contribution by fine features that are not of interest but small enough so that the contribution by features of interest is preserved.
2. The curvature of a point on the ridge is sufficiently different between two perpendicular directions. (a) The gcurvature and tcurvature differ by at least a factor of 2 (either can be larger).
3. The ridge is sharper than most of the valleys. (a) Curvature is greater than the absolute value of the 1 percentile point of the gcurvature distribution (1% of the gcurvature is lower than the 1 percentile point).
4. The slope is lower than the mean slope. (a) gslope (slope along the gradient) on ridge is less than the mean gslope of the surface. (b) The slope on the top of a ridge is typically near zero unless it is on a highly sloped surface.
5. The ridge is sufficiently long. (a) A potential ridge is not considered a ridge if its total length (including branches) is shorter than the mean radius of curvature along the potential ridge top; (b) A potential ridge is not considered a ridge if its total length is shorter than 3 times the mean width of the potential ridge; (c) Note that these dimensions are measured approximately.
6. Branches are sufficiently long. (a) A branch from the midsection of a ridge is considered a continuation of the ridge if it is longer than 1.5 times the mean width of the ridge. Otherwise, it is removed; (b) Note that these dimensions are measured approximately.

After identifying the ridges, the total length of all the ridges in the height map is calculated and divided by the area of the height map.

In some embodiments, the Fourier power spectrum is used to determine the degree of spatial irregularity or randomness of the first or second major surface of the diffuser. The topography can be defined relative to a reference plane along which the structured surface extends. For example, the structured first major surface 212 of diffuser 210 (see FIG. 2A) lies generally in, or extends generally along, an x-y plane. Using the x-y plane as a reference plane, the topography of the structured first major surface 212 can then be described as the height of the first major surface 212 relative to the reference plane as a function of position in the reference plane, i.e., the z-coordinate of the surface as a function of (x,y) position. The z-coordinate of the surface may be referred to as a surface profile or a height profile H(x,y). If the topography of a structured surface is measured in this manner, the spatial frequency content of the topographical function can then be analyzed to determine the degree of spatial irregularity or randomness of the surface (or to identify spatial periodicities present in the structured surface).

A general approach is to analyze the spatial frequency content using Fast Fourier Transform (FFT) functions. Because the topography provides height information along two orthogonal in-plane directions (x and y), the spatial frequency content of the surface is fully characterized by analyzing the spatial frequency content along each of the in-plane directions. The spatial frequency content can be determined by measuring the topography over a sufficiently large, and representative, portion of the structured surface, and calculating a Fourier power spectrum for each in-plane direction. The two resulting power spectra can then be plotted on graphs of power spectral density (PSD) versus spatial frequency. To the extent the resulting curves contain any local frequency peaks (not corresponding to zero frequency), the magnitude of such a peak can be expressed in terms of a "peak ratio" described further elsewhere in connection with FIG. 7.

A detailed procedure for determining the Fourier power spectrum is described in WO 2014/081693 (Pham et al.). In this approach, for a given diffuser sample, a ~1×1 cm piece of the sample is cut from the central portion of the sample. The sample piece is mounted on a microscope slide, and its structured surface that is to be characterized is Au—Pd sputter-coated. Two height profiles of the structured surface are obtained using confocal scanning laser microscopy (CSLM). Whenever possible, fields of view are chosen to give a good sampling of the topography and any periodicity that is present. The 2-dimensional (2D) power spectral density (PSD) is calculated for each 2D height profile. The 2D PSD is the square of the magnitude of the 2D spatial Fourier transform of the 2D height profile H(x,y). MATLAB is used to calculate the PSD using MATALB's Fast Fourier Transform (FFT) function. Before using the FFT, a 2D Hamming window is applied to the 2D height profile to help reduce ringing in the FFT caused by the finite spatial dimensions of the 2D height profile. The 2D PSD is summed in the x-direction to give the 1-dimensional (1D) PSD in the y-direction (which may be a downweb direction). Likewise, the 2D PSD is summed in the y-direction to give the 1D PSD in the x-direction (which may be a crossweb direction).

Analysis of the 1D PSDs with regard to spatial frequency peaks will now be described in connection with FIG. 7. In that figure, a hypothetical Fourier power spectrum curve is shown for illustrative purposes. The curve, which may represent either of the 1D PSD functions (x or y) discussed above, appears on a graph of power spectral density (PSD) versus spatial frequency. The vertical axis (PSD) is assumed to be plotted on a linear scale starting at zero. The curve is shown as having a frequency peak which (a) does not correspond to zero frequency, and (b) is bounded by two adjacent valleys that define a baseline. The two adjacent valleys are identified by points p1, at spatial frequency f1, and p2, at spatial frequency f2. The frequency f1 may be considered the frequency at which the peak starts, and f2 may be considered the frequency at which the peak ends. The baseline is the straight line segment (dashed line) that connects p1 and p2. The magnitude of the peak can be expressed in terms of the areas A and B on the graph. The area A is the area between the frequency peak and the baseline. The area B is the area under or beneath the baseline. That is, $B=(PSD(f1)+PSD(f2))*(f2-f1)/2$. The sum A+B is the area under or beneath the frequency peak. Given these definitions, the magnitude of the peak can now be defined in terms of a relative peak amplitude or "peak ratio" as follows:

$$\text{peak ratio}=A/(A+B).$$

Two 1D PSDs (two Fourier power spectra—one for the x-direction, one for the y-direction) for each sample can be evaluated, and to the extent the Fourier power spectrum includes any frequency peaks, the most prominent peak for each curve can be identified. The above-described peak ratio can then be calculated for the most prominent peak for each curve. Since the most prominent peak is measured, the calculated peak ratio is an upper limit for all peaks that may be present in the given Fourier power spectrum. Examples where the peak ratio are determined in this way are described in WO 2014/081693 (Pham et al.).

In some embodiments, the first major surface has a topography characterizable by a first and second Fourier power spectrum associated with respective first and second orthogonal in-plane directions, and to the extent the first Fourier power spectrum includes one or more first frequency peaks not corresponding to zero frequency and being bounded by two adjacent valleys that define a first baseline, any such first frequency peak has a first peak ratio of less than 0.8, or less than 0.7, and to the extent the second Fourier power spectrum includes one or more second frequency peaks not corresponding to zero frequency and being bounded by two adjacent valleys that define a second baseline, any such second frequency peak has a second peak ratio of less than 0.8, and less than 0.7.

Another quantity for characterizing either the first of second major surface of the diffusers of the present description is the slope distributions of the surfaces. Slope distributions provide a particularly useful characterization of the second major surface in embodiments where it is desired to have relatively shallow slopes (for example, most slopes less than 40 degrees). In some embodiments, no more than about 20 percent, or no more than about 10 percent, or no more than about 7 percent, or no more than about 5 percent, or no more than about 3 percent of the second portion of the second major surface has a slope magnitude that is greater than about 20 degrees, greater than about 15 degrees, greater than about 10 degrees, or greater than about 7 degrees, or greater than about 5 degrees, or greater than about 3.5 degrees. In some embodiments, the second surface major surface may have steeper slopes. For example, in some embodiments, no more than about 20 percent, no more than about 10 percent, no more than about 7 percent of the second major surface has a slope magnitude that is greater than about 20 degrees, or greater than about 30 degrees, or greater than about 35 degrees or greater than about 40 degrees. In some embodiments, a substantial fraction of second major surface has a slope magnitude greater than 1 degree and a substantial fraction of the second major surface has a slope magnitude less than 10 degrees or less than 15 degrees. In some embodiments, at least about 50 percent, or at least about 70 percent, or at least about 80 percent, or at least about 85 percent, or at least about 90 percent of the second portion of the second major surface has a slope magnitude that is greater than 1 degree. In some embodiments, no more than about 85 percent, or no more than about 80 percent, of the second portion of the second major surface has a slope magnitude that is greater than about 15 degrees, or that is greater than about 10 degrees.

Figure 8:
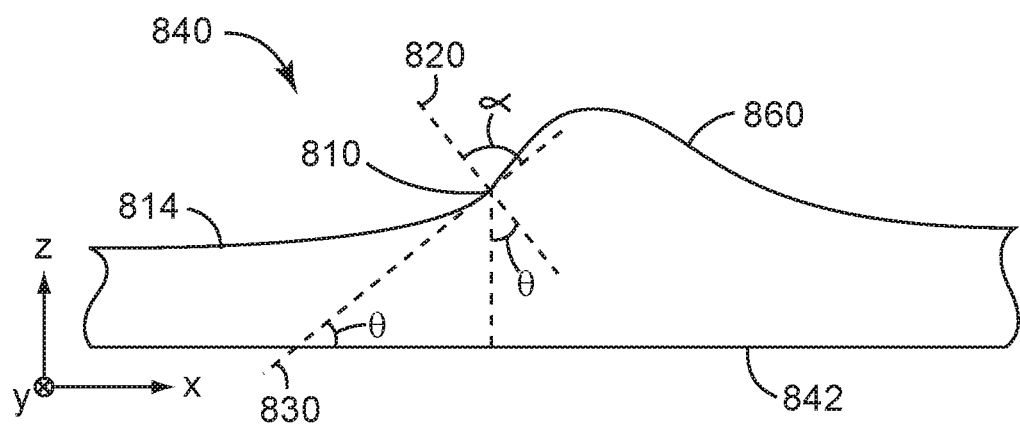
FIG. 8 is a schematic side or sectional view of a portion of a structured layer.

FIG. 8 is a schematic side view of a portion of structured layer 840. Structured layer 840 may correspond to second layer 236 of FIG. 2A, for example. FIG. 8 shows a structure 860, which may be a microstructure, in major surface 814 opposite major surface 842. Structure 860 has a slope distribution across the surface of the structure. For example, the structure has a slope □ at a location 810 where □ is the angle between normal line 820 which is perpendicular to the structure surface at location 810 (==90 degrees) and tangent line 830 which is tangent to the surface of the structure 860 at the same location. Slope □ is also the angle between tangent line 830 and major surface 842 of the layer 840.

The first or the second major surface can be characterized using atomic force microscopy (AFM) or confocal scanning laser microscopy (CSLM), for example, to determine a surface profile H(x,y) (i.e., a height, H, of the surface above a reference plane as a function of the orthogonal in-plane coordinates x and y). Slopes $S_x$ and $S_y$ along respective x- and y-directions can then be calculated from the following two expressions:

$$S_x = \partial H(x,y)/\partial x$$

$$S_y = \partial H(x,y)/\partial y.$$

The slope magnitude $S_m$ can be calculated from the following expression:

$$S_m = \sqrt{[\partial H/\partial x]^2 + [\partial H/\partial y]^2}.$$

The distributions of the slope in the x-direction, the slope in the y-direction, and the slope magnitude can be determined.

In some embodiments, at least one region in the first portion of the second major surface or in the second portion of the second major surface has a first surface angle distribution having a first half width at half maximum (HWHM) in a first direction (e.g., a distribution of slopes in the x-direction, $S_x$, may have a HWHM of $\sigma_x$) and a second surface angle distribution having a second HWHM in a second direction different from the first direction (e.g., a distribution of slopes in the y-direction, $S_y$, may have a HWHM of $\sigma_y$). In some embodiments, the first HWHM is substantially equal to the second HWHM and in some embodiments, the first HWHM is different from the second HWHM. For example, $|\sigma_x - \sigma_y|$ may be in a range of about 1 degree to about 5 degrees, or to about 10 degrees, or to about 15 degrees. In some embodiments, each of $\sigma_x$ and $\sigma_y$ are in a range of about 1 degree to about 10 degrees, or to about 15 degrees. In some embodiments the ratio of the larger of $\sigma_x$ and $\sigma_y$ to the smaller of $\sigma_x$ and $\sigma_y$ is greater than 1, or greater than 1.1, or greater than 1.2, or greater than 1.5 and is less than 15, or less than 10, or less than 5. In some embodiments, $|\sigma_x - \sigma_y|$ divided by $\sigma_x + \sigma_y$ is greater than 0.05, or greater than 0.1, or greater than 0.2.

The distribution of the structures can be varied by varying an amplitude (e.g., a peak to valley height) of the structures or by varying a spacing between adjacent structures. In some embodiments, the second major surface includes surface structures having an amplitude distribution and a spacing distribution and at least one of the amplitude and spacing distribution varies through the first portion of the second major surface and each of the amplitude and spacing distributions are substantially uniform in the second portion of the second major surface. By varying the height distribution, and/or the spacing distribution, and/or the distribution of the shapes of the structures, the slope distribution can be varied. In some embodiments, the second major surface includes surface structures having a slope distribution that varies substantially continuously through the first portion of the second major surface (e.g., the slope distribution that varies substantially continuously from the first edge 223 to the continuous boundary 217 between the first and second portions 216 and 218 of the second major surface 214) and that is substantially uniform in the second portion of the second major surface.

In some embodiments, the first major surface is made by microreplication from a tool having a structured surface. The structured surface of the tool can be made as described in described in WO 2014/081693 (Pham et al.) by forming a first layer of a metal by electrodepositing the metal using a first electroplating process resulting in a major surface of the first layer having a first average roughness, and forming a second layer of the metal on the major surface of the first layer by electrodepositing the metal on the first layer using a second electroplating process resulting in a major surface of the second layer having a second average roughness smaller than the first average roughness, the major surface of the second layer corresponding to the tool structured surface.

Figure 9:
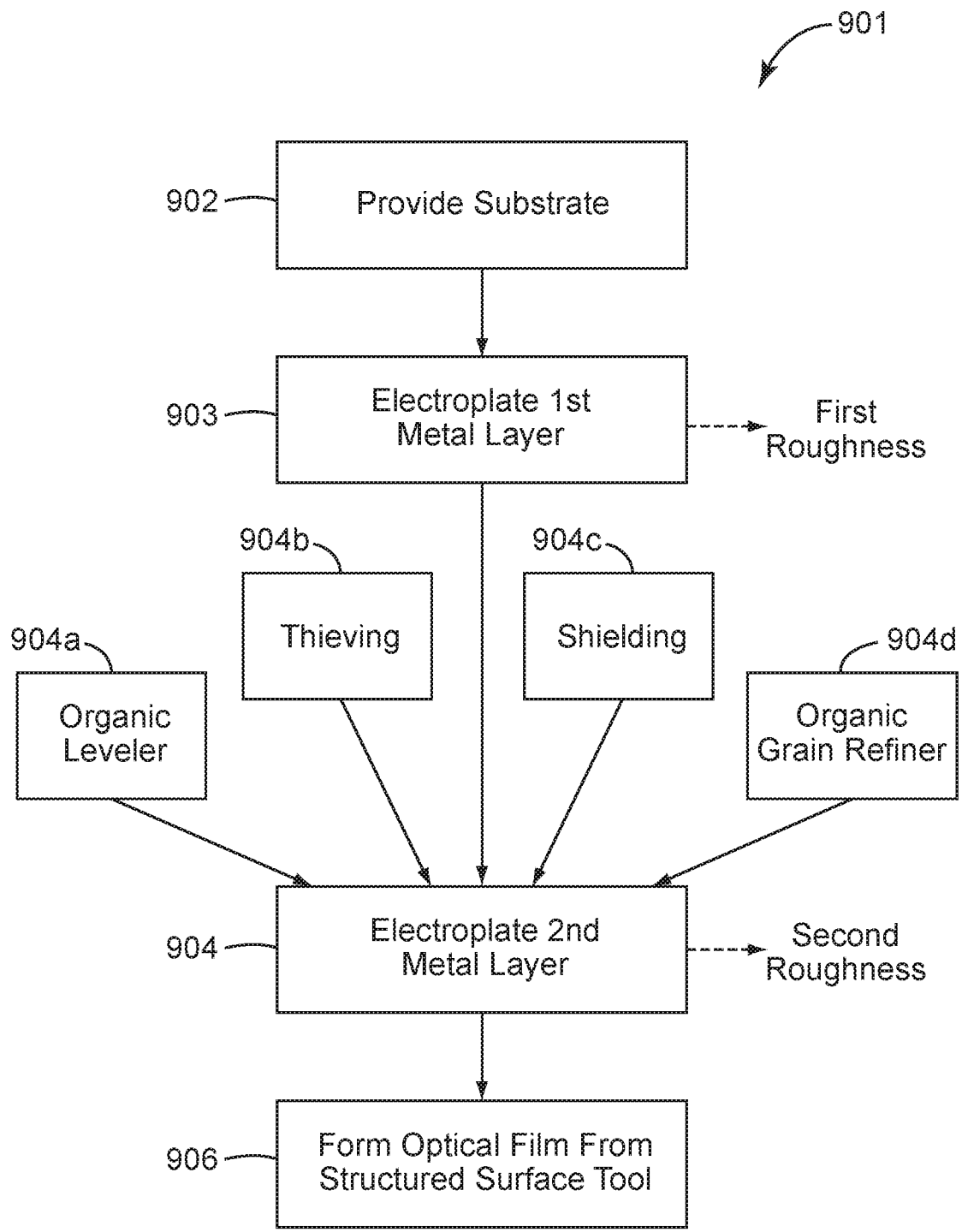
FIG. 9 is a schematic flow diagram depicting steps used to make a structured surface.

FIG. 9 shows an exemplary version 901 of a process for making a structured surface, such as, for example, the first major surface of a diffuser. In a step 902 of the process, a base or substrate is provided that can serve as a foundation upon which metal layers can be electroplated. The substrate can take one of numerous forms, e.g. a sheet, plate, or cylinder. Circular cylinders are advantageous in that they can be used to produce continuous roll goods. The substrate is typically made of a metal, and exemplary metals include nickel, copper, and brass. Other metals may however also be used. The substrate has an exposed surface ("base surface") on which electrodeposited layers will be formed in subsequent steps. The base surface may be smooth and flat, or substantially flat. The curved outer surface of a smooth polished cylinder may be considered to be substantially flat, particularly when considering a small local region in the vicinity of any given point on the surface of the cylinder. The base surface may be characterized by a base average roughness. In this regard, the surface "roughness" of the base surface, or the "roughness" of other surfaces mentioned herein, may be quantified using any generally accepted roughness measure, such as average roughness $R_a$ or root mean squared roughness $R_{rms}$, and the roughness is assumed to be measured over an area large enough to be fairly representative of the entire relevant area of the surface at issue.

In a step 903 of the process 901, a first layer of a metal is formed on the base surface of the substrate using a first electroplating process. Before this step is initiated, the base surface of the substrate may be primed or otherwise treated to promote adhesion. The metal may be substantially the same as the metal of which the base surface is composed. For example, if the base surface comprises copper, the first electroplated layer formed in step 903 may also be made of copper. To form the first layer of the metal, the first electroplating process uses a first electroplating solution. The composition of the first electroplating solution, e.g., the type of metal salt used in the solution, as well as other process parameters such as current density, plating time, and substrate speed, are selected so that the first electroplated layer is not formed smooth and flat, but instead has a first major surface that is structured, and characterized by irregular flat-faceted features. The size and density of the irregular features are determined by the current density, plating time, and substrate speed, while the type of metal salt used in the first electroplating solution determines the geometry of the features. Further teaching in this regard can be found in patent application publication US 2010/0302479 (Aronson et al.). The first plating process is carried out such that the first major surface of the first electroplated layer has a first average roughness that is greater than the base average roughness of the substrate.

After the first electroplated layer of the metal is made in step 903, with its structured major surface of first average roughness, a second electroplated layer of the metal is formed in step 904 using a second electroplating process. The second layer of the metal covers the first electroplated layer, and, since their compositions may be substantially the same, the two electroplated layers may no longer be distinguishable, and the first major surface of the first layer may become substantially obliterated and no longer detectable. Nevertheless, the second electroplating process differs from the first electroplating process in such a way that the exposed second major surface of the second electroplated layer, although structured and non-flat, has a second average roughness that is less than the first average roughness of the first major surface. The second electroplating process may differ from the first electroplating process in a number of respects in order to provide the second major surface with a reduced roughness relative to the first major surface.

In some cases, the second electroplating process of step 904 may use a second electroplating solution that differs from the first electroplating solution in step 903 at least by the addition of an organic leveler, as shown in box 904a. An organic leveler is a material that introduces into a plating bath an ability to produce deposits relatively thicker in small recesses and relatively thinner on small protrusions with an ultimate decrease in the depth or height of the small surface irregularities. With a leveler, a plated part will have greater surface smoothness than the basis metal. Exemplary organic levelers may include, but are not limited to, sulfonated, sulfurized hydrocarbyl compounds; allyl sulfonic acid; polyethylene glycols of various kinds; and thiocarbamates, including bithiocarbamates or thiourea and their derivatives. The first electroplating solution may contain, at most, trace amounts of an organic leveler. The first electroplating solution may have a total concentration of organic carbon less than 100, or 75, or 50 ppm. A ratio of a concentration of an organic leveler in the second electroplating solution to a concentration of any organic leveler in the first electroplating solution may be at least 50, or 100, or 200, or 500, for example. The average roughness of the second major surface can be tailored by adjusting the amount of organic leveler in the second electroplating solution.

The second electroplating process of step 904 may also or alternatively differ from the first electroplating process of step 903 by including in the second step 904 at least one electroplating technique or feature whose effect is to reduce the roughness of the second major surface relative to the first major surface. Thieving (box 904b) and shielding (box 904c) are examples of such electroplating techniques or features. Furthermore, in addition to or instead of an organic leveler, one or more organic grain refiners (box 904d) may be added to the second electroplating solution to reduce the average roughness of the second major surface.

After step 904 is completed, the substrate with the first and second electroplated layers may be used as an original tool with which to form optical diffusing films. In some cases the structured surface of the tool, i.e., the structured second major surface of the second electroplated layer produced in step 904, may be passivated or otherwise protected with a second metal or other suitable material. For example, if the first and second electroplated layers are composed of copper, the structured second major surface can be electroplated with a thin coating of chromium. The thin coating of chromium or other suitable material is preferably thin enough to substantially preserve the topography and the average roughness of the structured second major surface.

Rather than using the original tool itself in the fabrication of optical diffusing films, one or more replica tools may be made by microreplicating the structured second major surface of the original tool, and the replica tool(s) may then be used to fabricate a structured surface of the diffuser. A first replica made from the original tool will have a first replica structured surface which corresponds to, but is an inverted form of, the structured second major surface. For example, protrusions in the structured second major surface correspond to cavities in the first replica structured surface. A second replica may be made from the first replica. The second replica will have a second replica structured surface which corresponds to, and is a non-inverted form of, the structured second major surface of the original too.

After step 904, after the structured surface tool is made, optical diffusing films having the same structured surface (whether inverted or non-inverted relative to the original tool) can be made in step 906 by microreplication from the original or replica tool. The structured first major surface may be formed from the tool using any suitable process, including e.g. embossing a pre-formed film, or cast-and-curing a curable layer on a carrier film.

Figure 10:
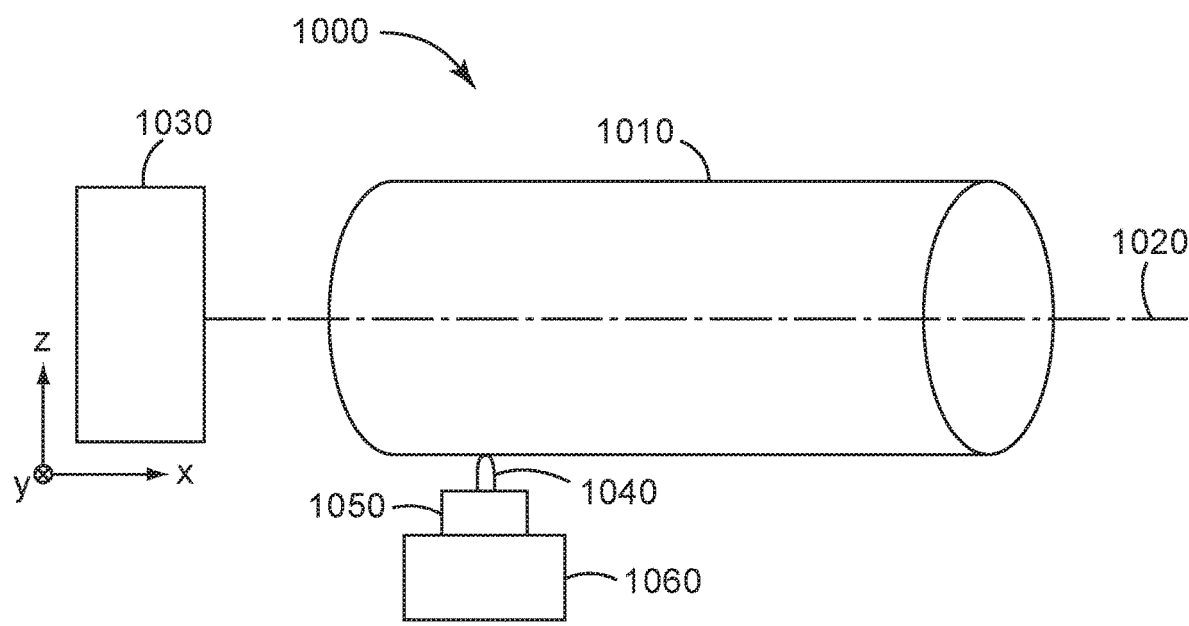
FIG. 10 is a schematic side or sectional view of a cutting tool system.

FIG. 10 is a schematic side-view of a cutting tool system 1000 that can be used to cut a tool which can be microreplicated to produce a structured surface, such as that of a second major surface having a varying haze, for example. Cutting tool system 1000 employs a thread cut lathe turning process and includes a roll 1010 that can rotate around and/or move along a central axis 1020 by a driver 1030, and a cutter 1040 for cutting the roll material. The cutter is mounted on a servo 1050 and can be moved into and/or along the roll along the x-direction by a driver 1060. In general, cutter 1040 is mounted normal to the roll and central axis 1020 and is driven into the engraveable material of roll 1010 while the roll is rotating around the central axis. The cutter is then driven parallel to the central axis to produce a thread cut. Cutter 1040 can be simultaneously actuated at high frequencies and low displacements to produce features in the roll that when microreplicated result in structures 860, for example.

Servo 1050 is a fast tool servo (FTS) and includes a solid state piezoelectric (PZT) device, often referred to as a PZT stack, which rapidly adjusts the position of cutter 1040. FTS 1050 allows for highly precise and high speed movement of cutter 1040 in the x-, y- and/or z-directions, or in an off-axis direction. Since the cutter 1040 can move an in the x-, y- and/or z-directions, structured surfaces having a distribution of amplitudes or slopes that vary in either or both of the x- and y-directions can be formed. Servo 1050 can be any high quality displacement servo capable of producing controlled movement with respect to a rest position. In some cases, servo 1050 can reliably and repeatably provide displacements in a range from 0 to about 20 microns with about 0.1 micron or better resolution.

Driver 1060 can move cutter 1040 along the x-direction parallel to central axis 1020. In some cases, the displacement resolution of driver 1060 is better than about 0.1 microns, or better than about 0.01 microns. Rotary movements produced by driver 1030 are synchronized with translational movements produced by driver 1060 to accurately control the resulting shapes of structures 860.

Cutting tool system 1000 can be used to make a tool which can be used to form structured first major surface 212 (see FIG. 2A) and/or cutting tool system 1000 can be used to make a tool which can be used to from structured second major surface 214. When used to make a tool to form structured second major surface 214, the rotary movements produced by driver 1030 and translational movements produced by driver 1060 are selected to produce a variation in one or more of the amplitude distribution, the spacing distribution, the structure shape distribution, and the slope distribution in the portion of the tool that corresponds to the first portion 216 of the structured second major surface 214.

The engraveable material of roll 1010 can be any material that is capable of being engraved by cutter 1040. Exemplary roll materials include metals such as copper, various polymers, and various glass materials. Cutter 1040 can be any type of cutter and can have any shape that may be desirable in an application. Suitable cutters are described in U.S. Pat. No. 8,657,472 (Aronson et al.) or U.S. Pat. No. 8,888,333 (Yapel et al.).

The structured second major surface may be formed from the resulting tool using any suitable process, including, e.g. embossing a pre-formed film, or cast-and-curing a curable layer on a substrate. The original tool or a replica of the tool may be used to from the structured surface as described elsewhere herein.

In some embodiments, an optical stack is provided that includes an optical film and any of the optical diffusers of the present description substantially coextensive with the optical film with the structured top surface (e.g., first major surface 112 or 212) of the diffuser facing a structured bottom surface of the optical film. The optical film may include a structured top surface comprising a plurality of substantially parallel top structures extending linearly along a first direction; and a structured bottom surface comprising a plurality of substantially parallel bottom structures extending linearly along a second direction different from the first direction, each top and bottom structure comprising opposing first and second curved faces extending from respective opposite first and second ends of a base of the structure and meeting at a peak of the structure. In some embodiments, the optical film and the optical diffuser are bonded together along corresponding edges thereof to form an air gap between the optical film and the optical diffuser. In some embodiments, each of the structured top and bottom surface comprises a plurality of substantially randomly arranged structures. In some embodiments, the optical diffuser includes a structured top surface facing the structured bottom surface of the optical film and having a substantially uniform first optical haze across the structured top surface; and a structured bottom surface having a first portion along a first edge of the structured bottom surface and a second portion extending from the first region to an opposite second edge of the structured bottom surface, at least some regions of the first portion having a third optical haze no less than the first optical haze, the second portion having a substantially uniform second optical haze across the second portion, the second optical haze being less than the first optical haze. In some embodiments, the first optical haze of the top surface is substantially uniform and is greater than about 70%, the third optical haze in a first region of the first portion of the diffuser is greater than about 95%, and the second optical haze is of the second portion of the second major surface is substantially uniform and is less than about 70%.

In some embodiments, a backlight is provided that includes a light source, a lightguide having an input surface proximate the light source and an output surface, any of the optical diffusers of the present description disposed on the lightguide, and an optical film disposed on the optical diffuser. In some embodiments, the optical diffuser has a structured top surface having a substantially uniform first optical haze across the structured top surface; and a structured bottom surface facing the output surface of the lightguide and having a first portion along a first edge of the structured bottom surface proximate the input surface of the lightguide and a second portion extending from the first portion to an opposite second edge of the structured bottom surface, at least a first region of the first portion having a third optical haze no less than the first optical haze, the second portion having a substantially uniform second optical haze across the second portion, the second optical haze being different from the first optical haze. The optical film may include a first structured surface including a plurality of substantially linear parallel first structures facing the structured top surface of the optical diffuser; a second structured surface including a plurality of substantially linear parallel second structures facing away from the structured top surface of the optical diffuser, each first and second structure comprising opposing curved first and second faces, the curved first and second faces having different axes of curvature.

Figure 17:
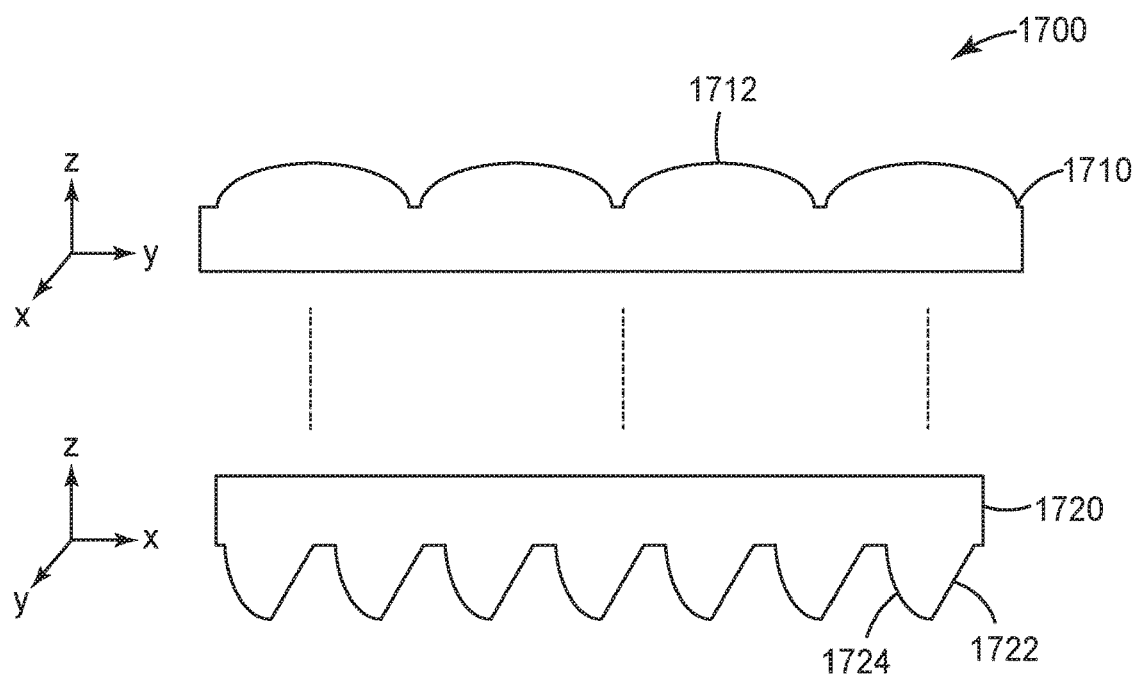
FIG. 17 is a split front-side elevation cross-section of an optical film.

FIG. 17 is a split front-side elevation cross-section of an exemplary optical film that can be advantageously used with the diffusers of the present description. Optical film 1700 includes top structured surface 1710 with microstructure 1712, and bottom structured surface 1720 with microstructures with first face 1722 and second face 1724.

In FIG. 17, the structured surfaces (top structured surface 1710 and bottom structured surface 1720) are disposed such that a length direction of the microstructures are generally not parallel. In some embodiments, the length direction of the microstructures are oriented orthogonally from one another. However, in order to more easily depict a simultaneous cross-section of both the top and bottom structured surfaces, FIG. 17 (along with FIG. 18) are split front-side elevation cross-sections; that is, as the reference coordinate systems to the left of each structured surface suggest, the figures are actually two perspectives spliced together.

Top structured surface 1710 includes microstructure 1712. In some embodiments, the structured top surface includes a plurality of parallel microstructures. In some embodiments, the parallel microstructures may be linear microstructures. By linear, it is meant that a peak of one of the microstructures is a line across the top structured surface (when viewed, for example, from a top plan view). In some embodiments, and for practical reasons including the limits of manufacturing processes, linear microstructures may include small deviations from precisely linear. In some embodiments, the microstructures may be linear but for a periodic or nonperiodic variation in pitch. In some embodiments, the microstructures may be linear but may vary in height, either periodically or nonperiodically. In some embodiments, there may be space or "land" between adjacent microstructures. In some embodiments, top structured surface 1710 includes spacing between adjacent microstructures in a range from about 0.5 µm to about 5 µm. The spacing may be constant or varying.

Microstructure 1712 may be substantially curved. In some embodiments, microstructure 1712 has a substantially cylindrical or semi-cylindrical shape. In some embodiments, microstructure 1712 is a semi-circle or a semi-ellipse along a cross-section orthogonal to the length of the microstructure. In some embodiments, microstructure 1712 is characterized by a height h, measured from the peak of microstructure 1712 to the base of microstructure 1712, along a line orthogonal to the base of microstructure 1712. The lowest points on top structured surface 1710 may be used to determine the base of microstructure 1712. Microstructure 1712 may also be characterized by a radius of curvature R, and the ratio of h/R may be any suitable value. In some embodiments, h/R is not greater than 0.4.

In some embodiments, the centers of curvatures for all the cross sections of a face of a structure taken across the direction the structures extend may be considered together and referred to as an "axis" of curvature. In some embodiments, the axes of curvature of the curved faces are different.

Top structured surface 1710 may be formed from any suitable method and from any suitable material. For example, top structured surface 1710 may be selectively etched or ground. In some embodiments, top structured surface 1710 may be formed at least in part through a two-photon mastering process. In some embodiments, top structured surface 1710 relies on a cast-and-cure process utilizing an inversely shaped tool. In some cases, top structured surface may be formed from a UV-crosslinkable or UV-curable resin such that appropriate light exposure causes the resin to harden, separate from the mold or tool, and permanently retain its shape. In some embodiments, top structured surface 1710 may be formed through an additive process, such as 3D-printing. In some embodiments, top structured surface 1710 may be injection molded. Top structured surface 1710 may be formed in a monolithic piece of material or it may be formed in a top layer of material disposed on a substrate or a dimensionally stable or warp resistant layer. The material or materials may be selected for their material, physical, or optical properties, such as clarity, scratch or abrasion resistance, warp resistance, birefringence or lack thereof, ability to be microreplicated in, haze, Tg (glass transition temperature), potential to be bonded to other surfaces, or any other suitable characteristic.

Bottom structured surface 1720 includes microstructures, each with first face 1722 and second face 1724. As for top structured surface 1710, the microstructures may be linear microstructures; however, recall that the perspective is split in FIG. 17, such that in the exemplary configuration shown in this figure, the microstructures of the top and bottom structures run generally orthogonally to one another. Bottom structured surface 1720 may include spaced apart adjacent structures, with a spacing being—in some embodiments— between 0.5 µm and 3 µm.

First face 1722 is substantially flat, in that from a cross-section orthogonal to the length of the microstructure, it appears as a straight line. In other embodiments, first face 1722 may have a degree of curvature. Second face 1724 is curved, in that from a cross-section orthogonal to the length of the microstructure, it appears as an arc or curve. In some embodiments, the microstructures may include more than two faces, or two faces and a peak or joining portion, for example. In some embodiments, second face 1724 may have a constant curvature, or it may have a piecewise curvature. In some embodiments, second face 1724 may have a continuously varying curvature. In some embodiments, each first face may be the same or substantially the same shape and size. In some embodiments, each second face may be the same or substantially the same shape and size. In some embodiments, one or more of the first and second faces may vary in one or more of shape or size, either periodically, non-periodically, or in a gradient.

Optical film 1700 may be, overall, formed from any suitable material or combination of materials and have any suitable dimensions. In some embodiments, optical film 1700 may be sized or shaped for the particular display or lighting application. The structures on the structured surfaces of optical film 1700 may run orthogonally as described, or they may extend or run simply in a first direction and a second direction, where the first direction and the second direction are different from one another. For example, an angle between the first and second direction may be between 78 and 90 degrees. In some embodiments, the top structured surface and the bottom structured surface cover the same area. In some embodiments, top structured surface 1710 and bottom structured surface 1720 are two sides of the same monolithic film. In some embodiments, the two structured surfaces or their respective substrates are laminated to or attached to each other.

Figure 18:
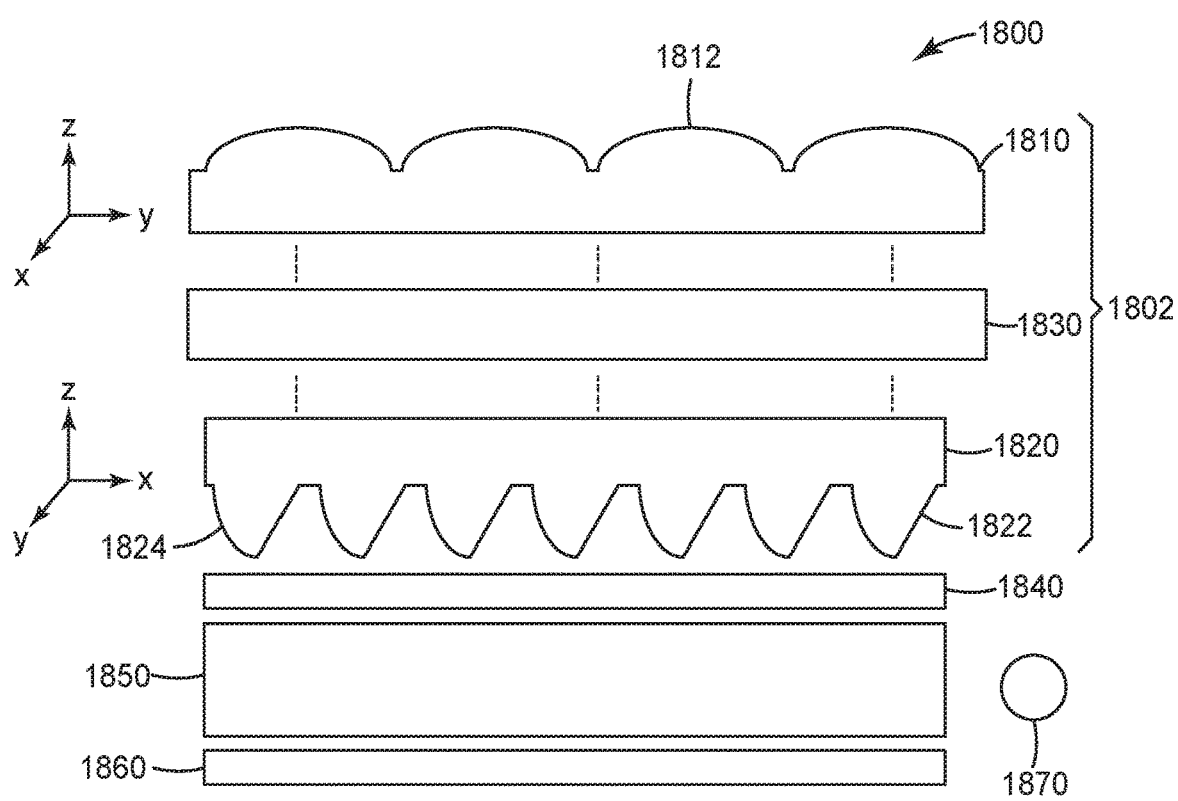
FIG. 18 is a split front-side elevation cross-section of a backlight including an optical film and a diffuser.

FIG. 18 is a split front-side elevation cross-section of a backlight including an optical film and a diffuser. Backlight 1800 includes optical film 1802 having top structured surface 1810 with microstructure 1812, bottom structured surface 1820 including first face 1822 and second face 1824, and optional intermediate layer 1830. Backlight 1800 further includes diffuser 1840, lightguide 1850, reflector 1860, and light source 1870.

Optical film 1802 is similar to that depicted in FIG. 17, including top structured surface 1810 with microstructure 1812 and bottom structured surface 1820 including microstructures with first face 1822 and second face 1824. Optical film 1802 also includes intermediate layer 1830 which may, for example, be a reflective polarizer or a combination of a reflective polarizer and a quarter wave layer or a quarter wave plate. Intermediate layer 1830 in FIG. 18 is simplified and, as such, may represent both a quarter wave plate and a linear reflective polarizer although these may be treated as separate layers. Optical film 1802 may be a monolithic layer or it may be formed from several laminated portions or layers.

Reflective polarizers suitable for use as intermediate layer 1830 or as a component of intermediate layer 1830 may be multilayer reflective polarizers. Multilayer reflective polarizers are formed from coextruded packets of alternating high and low index layers that, when oriented appropriately, possess internal index of refraction interfaces having appropriate thickness to reflect light of certain polarizations through constructive interference. Examples of reflective polarizers include DBEF and APF, (available from 3M Company, St. Paul, Minn.).

The rest of backlight 1800 includes diffuser 1840 disposed between optical film 1802 and lightguide 1850, lightguide 1850 itself, reflector 1860, and light source 1870. Diffuser 1840 may be any of the diffusers described herein with the first portion of the diffuser (e.g., portion 216) disposed closest to the light source 1870.

In some embodiments, diffuser 1840 may cover substantially all of the area of lightguide 1850 or optical film 1802. In some embodiments, diffuser 1840 may be designed to prevent physical damage to lightguide 1850 or the peaks of bottom structured surface 1820. Damage may include scratching or even bending or breaking of portions of the structured surface, for example after experiencing a shock, such as an impact or collision. In certain applications diffuser 1840 may have physical properties that make it advantageous for shock absorption, such as characteristics that make it appropriately cushioning.

In some embodiments, diffuser 1840 may be laminated or attached to one or more of lightguide 1850 and optical film 1802. Diffuser 1840 may be attached to lightguide 1850, for example, with a layer of pressure sensitive or optically clear adhesive, or through one or more pieces of edge or rim tape. In some embodiments, diffuser 1840 may be bonded to lightguide 1850 with a low index adhesive layer. Such a low index adhesive layer may include a plurality of voids.

Lightguide 1850 may be any suitable size or shape, and may be formed from any suitable material. In some embodiments, lightguide 1850 may be formed from an injection molded monolithic piece of acrylic, for example, or it may be formed from any other suitable material. Lightguide 1850 may have its material selected for advantageous optical characteristics, such as high transmission, low absorption, or low scattering, or physical characteristics such as rigidity, flexibility, or temperature and warp resistance. In some embodiments, lightguide 1850 may be a wedge lightguide. In some embodiments, lightguide 1850 may include or contain extraction features, such as printed dots, negative microfeatures (i.e., indentations where the air/lightguide interface tends to defeat total internal reflection by scattering or reflecting light at subcritical angles, which then passes through the other surface of the lightguide), or positive microfeatures. The extraction features may be arranged in a gradient pattern so that light is evenly extracted over the area of the lightguide (and, ultimately, backlight 1800 overall). In other words, the extraction features may be less densely packed in portions of the lightguide that have more overall light, such as the area proximate the light source. Alternatively, for some applications, the extraction features may be more densely packed in areas where greater light output is desired, such as under the numbers or buttons on a phone keypad or the like. The extraction features may vary in size, shape, and number either periodically, in a gradient, or non-periodically.

Reflector 1860 is any suitable layer that is a broadband reflector of light. In some embodiments, reflector 1860 is a metallic reflector, such as aluminum or silver, or a substrate with a metallic reflecting surface deposited thereon. In some embodiments, reflector 1860 is a multilayer optical film.

Similarly to the multilayer optical film reflective polarizer described herein, the multilayer optical film reflector includes alternating high and low index layers of polymeric materials carefully selected and capable of developing birefringence when oriented. The layers are coextruded and oriented such that a broad spectrum of light is reflected by the interfaces between the layers through constructive interference. The optical thickness of each layer pair is designed such that different layer pairs contribute to the reflection of different wavelengths of light. An exemplary multilayer optical film reflector is Enhanced Specular Reflector, or ESR (available from 3M Company, St. Paul, Minn.). Suitable reflectors may reflect at least 90% of light, 95%, 98% of light, or even 99%. The reflector may provide a reflection pattern characterized as diffuse (or even Lambertian), specular, or semi-specular.

Light source 1870 may be any suitable light source or combination of light sources. Conventional light sources such as light emitting diodes (LEDs), cold cathode fluorescent lamps (CCFLs), and even incandescent bulbs may be used. In some embodiments, although light source 1870 is depicted as a single object in FIG. 18, combinations of LEDs may be used to provide a sufficiently white input light, but, depending on the application, any suitable spectra or combination of spectra may be utilized. In some embodiments, the LEDs may use phosphors or other downconverting elements. Light source 1870 may include suitable injection or collimation optics to aid in coupling light into lightguide 1850 or to help shape the light input for the lightguide. Light source 1870 may be disposed on either side of lightguide 1850: for example, it may be disposed such that light from light source 1870 exiting the lightguide is incident first on the flat first faces, or, alternatively, light from light source 1870 exiting the lightguide is incident first on the curved second faces. The rest of the components of backlight 1800 can be adjusted accordingly.

Depending on the application, some characteristics of the overall design of backlight 1800 may have a significant impact on its performance; for example, the design of the bottom structured surface 1820 of optical film 1802 and the output distribution of lightguide 1850. The design of lightguide 1850 may take into account that optical film 1802 may have certain input angles that provide a more desirable output than certain other input angles; in other words, the lightguide and backlight overall may be designed to provide optical film 1802 with these input angles. The opposite is also possible: optical film 1802 may be designed to have the output angle of the lightguide be an input angle that provides a desirable output. Diffuser 1840 may be designed to provide hot spot reduction and to provide protection for optical film 1802.

Optical film 1802 may be configured such that at least some of the light emitted by light source 1870 that eventually exits backlight 1800 is recycled by top structured surface 1810. By recycled, it is meant that the light is reflected or otherwise redirected back toward lightguide 1850. Such light may be reflected by reflector 1860 and directed back toward optical film 1802. Because at least some of the light redirected by top structured surface 1810 is not at a preferred viewing angle or may not otherwise be at a useable or desirable angle, the redirection may be referred to as recycling because the light is cycled again through the backlight. In some embodiments, at least 10% of the light emitted by light source 1870 is recycled by top structured surface 1810. In some embodiments, at least 20% of the light emitted by light source 1870 is recycled by top structured surface 1810.

Figure 19:
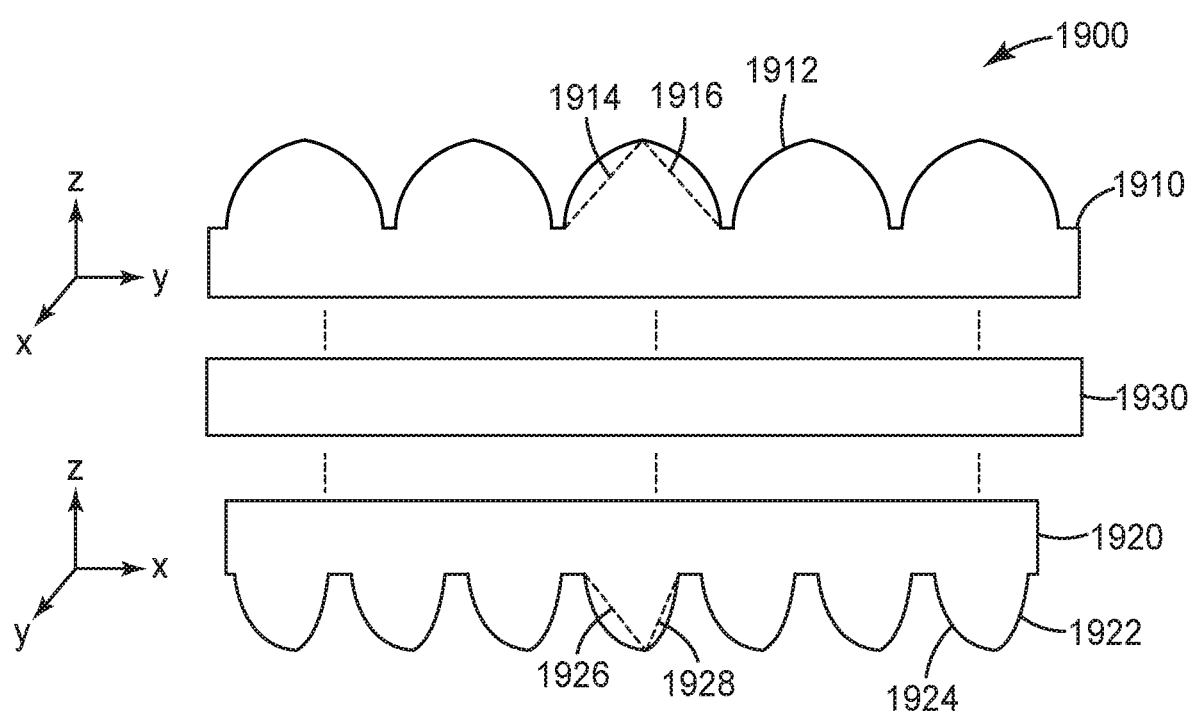
FIG. 19 is a split front-side elevation cross-section of another optical film.

FIG. 19 is a split front-side elevation cross-section of another optical film that may be used with a diffuser of the present description as in FIG. 18. Optical film 1900 includes top structured surface 1910 with microstructure 1912 characterized by first top line 1914 and second top line 1916, bottom structured surface 1920 with microstructures having first face 1922 and second face 1924, and characterized by first bottom line 1926 and second bottom line 1928. Optical film 1900 may also include intermediate layer 1930.

Figure 7:
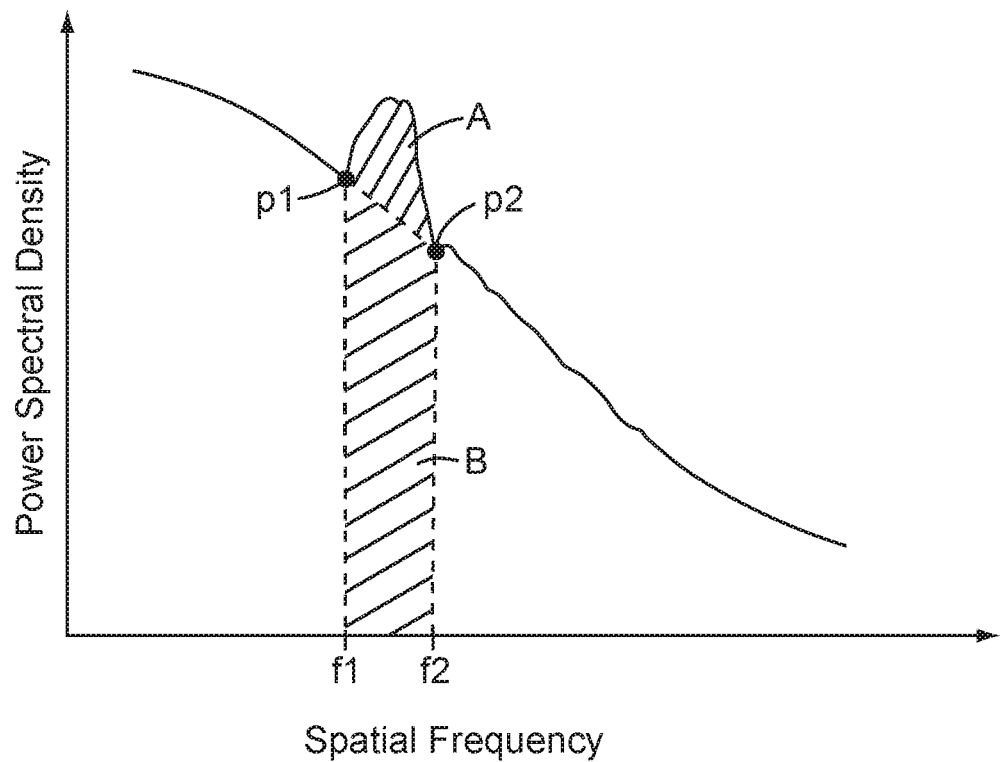
FIG. 7 is a graph of power spectral density vs. spatial frequency.

Optical film 1900 of FIG. 7 is similar to optical film 1802 of FIG. 18, except that microstructure 1912 is characterized by first top line 1914 and second top line 1916 and microstructures of bottom structured surface 1920 have two faces that are arcs or otherwise curved and are characterized by first bottom line 1926 and second bottom line 1928. In some embodiments, microstructures of the top structured surface 1910 may have two faces that are arcs or otherwise curved, as depicted and described for the microstructures of the bottom structured surface 1920. The curved faces (of either the top or bottom structures) may have the same radius of curvature or they may have different radii of curvature. In some embodiments, the curved faces of either the top or bottom structures may have a same center of curvature, but in some embodiments they may have different centers of curvature. In some embodiments they may have a piecewise curvature or a varying curvature. In some embodiments, each face of each microstructure 1912 of top structured surface 1910 may have a radius of curvature between 20 µm and 40 µm. In some embodiments, each face of each microstructure of bottom structured surface 1920 may have a radius of curvature between 40 µm and 80 µm or between 60 µm and 80 µm. In some embodiments, the centers of curvatures for all the cross sections of a face of a structure taken across the direction the structures extend may be considered together and referred to as an "axis" of curvature. In some embodiments, a face having piecewise curvature may have multiple axes of curvature for each face. In some embodiments, the axes of curvature of the curved faces are different. In some embodiments, each of the axes of curvature of each the curved faces are different.

In some embodiments, each top and bottom structure includes opposing curved first and second faces, the curved first and second faces having different axes of curvature.

First top line 1914 and second top line 1916 are lines connecting the intersection of the first and second ends of the base of microstructure 1912 with the peak of the microstructure. In some embodiments, the first top line 1914 and second top line 1916 may form an angle with themselves, that angle being in a range between about 60 degrees and 120 degrees. The first and second top lines may form an angle between themselves and the base of the microstructure, and that angle may be between 5 and 60 degrees, or between 35 and 45 degrees. The angles between the lines and the base may be the same or different for the two top lines.

First bottom line 1926 and second bottom line 1928 are, similarly, lines connecting the intersection of the first and second ends of the bottom microstructure (i.e., where first face 1922 and second face 1924 intersect with the base of the microstructure) to the peak of the microstructure. First bottom line 1926 and second bottom line 1928 may form an angle between themselves in a range from 60 degrees to 130 degrees. The first and second bottom lines may form an angle between themselves and the base of the microstructure, and that angle may be between 25 and 88 degrees, or between 55 and 65 degrees. The angles between the lines and the base may be the same or different for the two bottom lines.

In some embodiments, where the peak is rounded or curved, it may be preferable to characterize the angle formed between, for example, first bottom line 1926 and second bottom line 1928, except that the first and second bottom lines connect the first and second ends, respectively, and instead run tangent to their respective sides of the curved peak. The angle formed at the point where they eventually intersect may be in a range between 50 degrees and 70 degrees. In some embodiments, any radius of curvature of the peak of the top and bottom microstructures is smaller than the radius of curvature for either of the faces or sides (not including the peak) of that particular microstructure.

Depending on the application, certain geometric characteristics, and in particular the geometric characteristics of the structured surfaces, may be especially suitable for the optical films described herein. For example, in FIG. 7, each of the structures on the top and bottom of the optical film may have first and second faces that, from the view of a cross-section perpendicular to the linear extent of the structures, are arcs that do not have a same center of curvature. In some embodiments, the structures are spaced apart with a certain pitch measured from, for example peak to peak. In some embodiments, a first pitch of the top structured surface and a second pitch of the bottom structured surface is between 10 and 100 µm, or between 10 and 50 µm. In some embodiments, either the top structured surface or the bottom structured surface has a variable pitch. In some embodiments, the pitches may be expressed in relation to the radii of curvature of each of the faces of the structures on the corresponding structured surface. In some embodiments, a ratio of a radius of curvature of the first and second faces of structures of a structured surface to the pitch of the structured surface is between 0.8 and 10, 1.5 and 20, 1 and 3, or between 2 and 5. In some embodiments, that ratio may be between 0.8 and 10 for the top structured surface, and between 1.5 and 20 for the bottom structured surface. In some embodiments, that ratio may be between 1 and 3 for the top structured surface, and between 2 and 5 for the bottom structured surface. In some embodiments, the height of at least one of the structures varies along the linear extent of the structure.

EXAMPLES

Edge Graded Diffuser Film

A graded diffuser film was made as follows. An electroplated cylindrical microreplication tool was cut using an engraver with a diamond having a 110° apex angle to produce a set of hexagonal-shaped indentations that varied in depth around the circumference of the tool. Where the diamond cut deeper into the tool, more surface area of the tool was affected; when the cut was shallower, less surface area of the tool was affected. The first 10 mm of hexagonal indentations on the tool were the deepest. For the next 13 mm to about 23 mm around the circumference, the depth decreased monotonically. From 10 mm to about 17 mm the depth decreased following a profile corresponding approximately to a cubic spline. From about 17 mm to about 23 mm the depth changed linearly up to a constant depth that continued around the tool's circumference. Multiple parallel circumferential cuts were made in this way.

The structures on the tool were then microreplicated on a PET film (about 1 mil thick) using a standard cast and cure process. The microstructures arising from the deeper grooves were taller than the microstructures arising from the shallower grooves since the microstructure heights followed a pattern inverse to the tool structure, so the front side of the film had a 10 mm long segment of tall structures followed by microstructures of gradually reduced height over a length of 13 mm after which the height remained constant to about 95 mm.

A second electroplated microreplication tool was made with uniform diffusing structures cut across the area of the tool. These structures were then microreplicated on the opposite side of the PET film from the structures described above.

These second uniform diffusing structures were also characterized by microreplicating them on a separate film and measuring the haze using a HazeGard Plus haze meter (available from BYK-Gardner, Columbia Md.). The haze was about 95%.

Characterization of Haze

Figure 12:
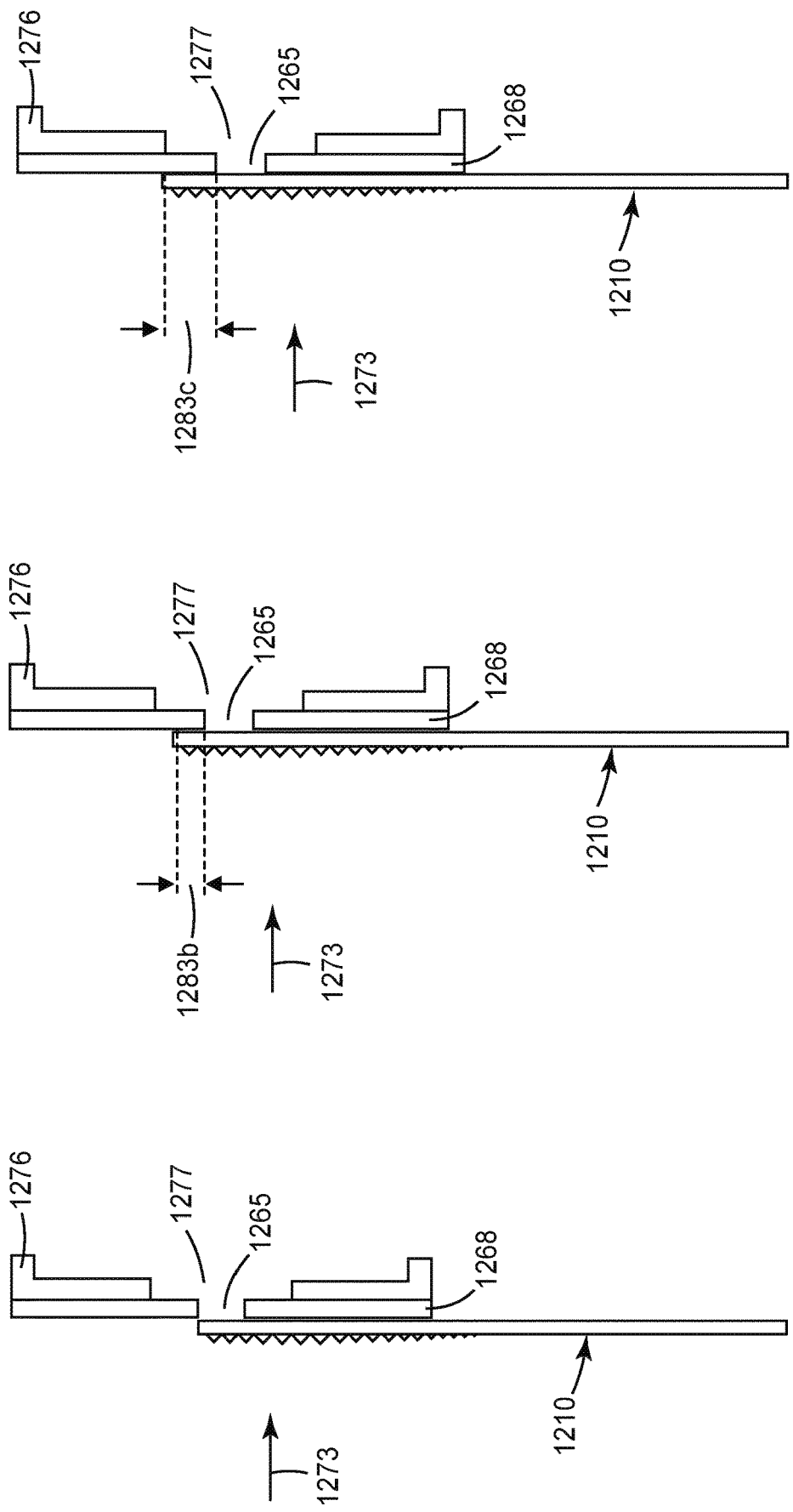
FIGS. 12A-12C are schematic illustrations of a haze measurement technique.
Figure 13:
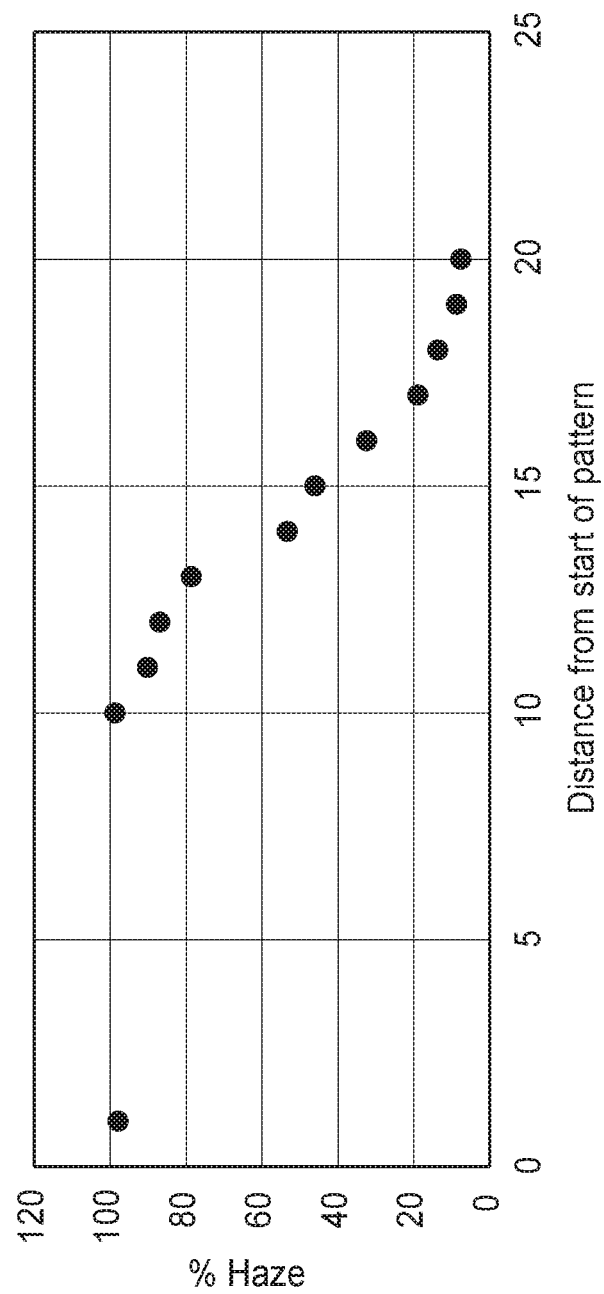
FIG. 13 is a graph of haze as a function of distance.

The uniformly diffusing top surface of the film described in "Edge Graded Diffuser Film" was coated with a resin having a refractive index close to the index of the top structures in order to eliminate the contribution to haze from the top surface. The resulting film was then evaluated to determine the haze associated with each segment of the bottom side of the film. The measurement apparatus is shown in FIGS. 12A-12C. The film 1210 was positioned on a structure having a 2 mm slit 1265 created by using Enhanced Specular Reflector (ESR) film 1268 (available from 3M Co., St. Paul Minn.) to mask the upper and lower portions over the haze meter instrument's aperture 1277 (which had a diameter of approximately one inch (2.54 cm)) in portion 1276 of the haze meter. The film was oriented so that the grading in the size of the bottom structures ran perpendicular to the edges of the slit. The film was moved in stages across the slit as measurements of haze were taken every millimeter. In FIG. 12A an edge of the film 1210 is aligned with an edge of the slit 1265. In FIG. 12B, the film 1210 has been shifted by a distance 1283b of about 1 mm and in FIG. 12C, the films 1210 has been shifted by a distance 1283c of about 2 mm. A HazeGard Plus haze meter was used to measure the haze of the film segment lying over the slit. The haze meter produced an incident light having a direction 1273 as indicated in FIGS. 12A-12C. FIG. 13 shows haze as a function of position across the film. The leftmost portion of the film had a haze near 100%. As the height of the microstructures started to decrease at 10 mm from the left edge of the film, the haze fell from near 100% to less than 10%.

Measurement of Hot Spot Contrast

Figure 14A:
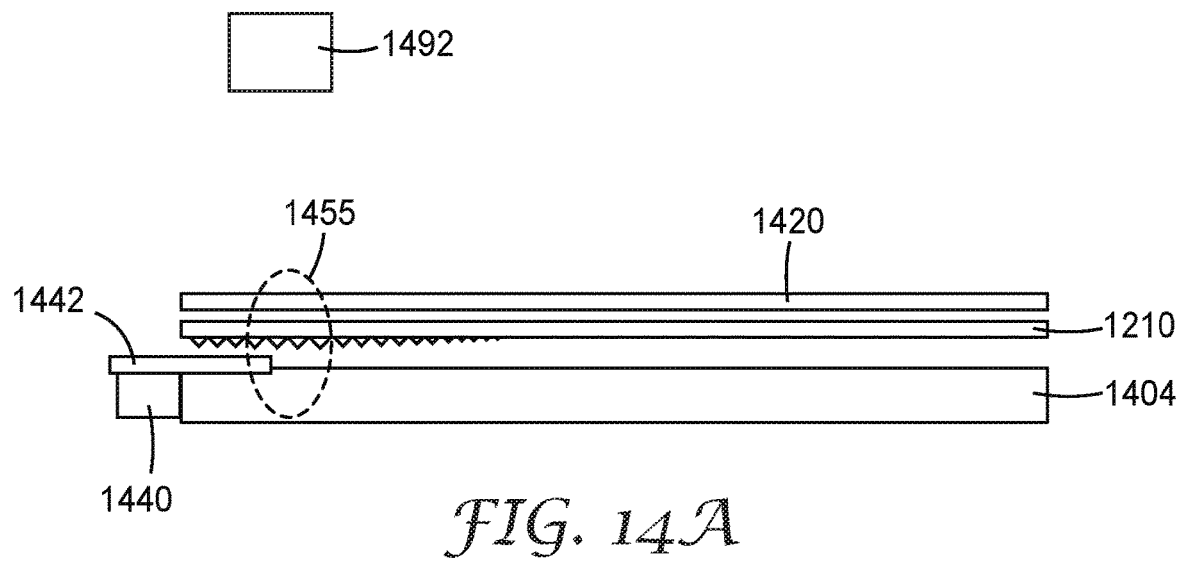
FIGS. 14A-14B are schematic illustrations of a hot spot measuring technique.
Figure 14B:
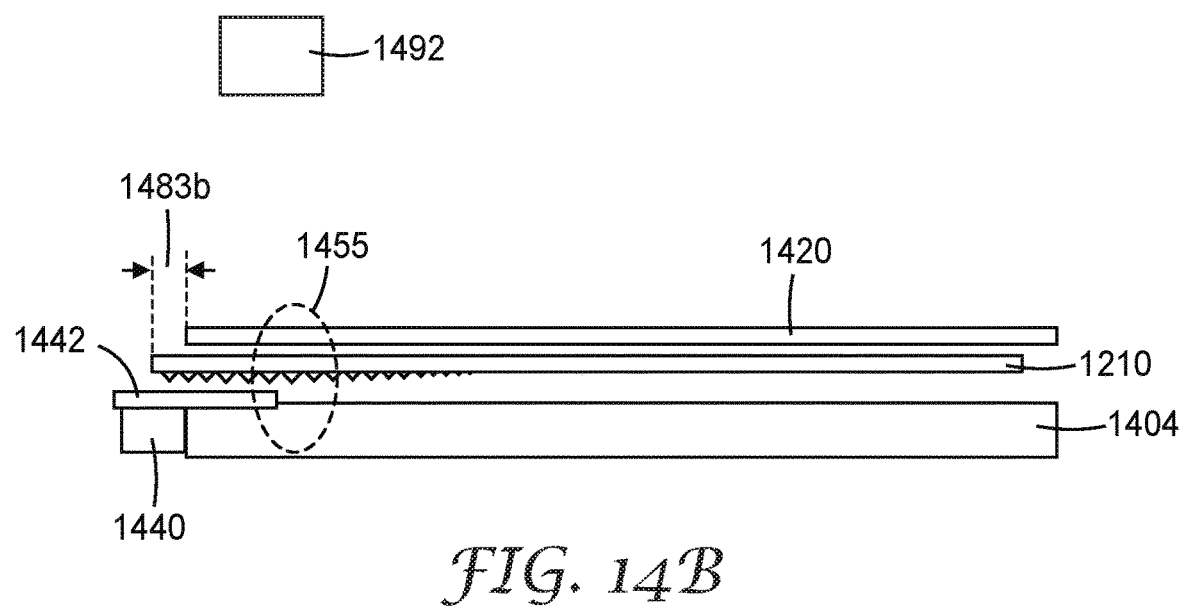
Figure 15:
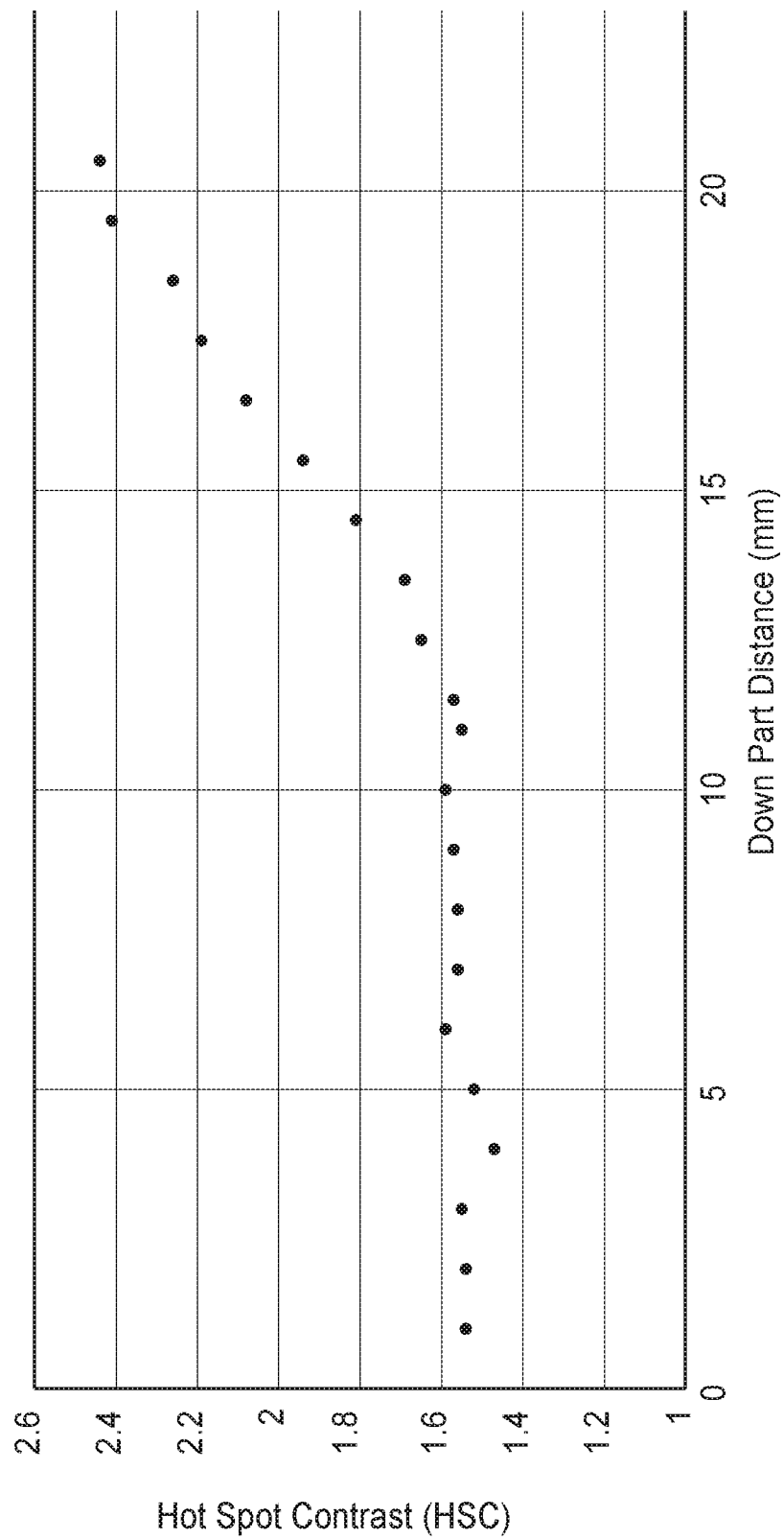
FIG. 15 is a graph of hot spot contrast as a function of distance.

An apparatus as illustrated in FIGS. 14A-14B was assembled to test the optical diffusion of LED hot spots for the film 1210 described in "Edge Graded Diffuser Film". The light guide 1404 and associated set of twelve LEDs 1440 on a flex circuit board 1442 were removed from an edge-lit commercially available smart phone. A layer 1420 consisting of two crossed prism films of the kind described in US. Pat. App. Pub. No. 2013/0004728 (Boyd et al.) was placed on, but not attached to, the uniform diffusing top side of the film, opposite the side with the microstructures of varying size. The resulting film was positioned on the light guide with the side having microstructures of varying size facing the light guide and oriented so that the edge with the largest structures was parallel to and nearest the row of LEDs 1440. The flex circuit board 1442 attached to the LEDs partially extended over the light guide. Hot spot measurements were taken with a Prometric PM-1613F-1 imaging photometer 1492 (available from Pro-Lite Technology, Milton Keynes UK) positioned about 42 cm above the light guide and directly over the region 1455 of the light guide where the flex plate ended. Measurements were taken every millimeter as the film 1210 was moved in stages across the junction where the flex plate ended, one millimeter at a time. The zero position is illustrate in FIG. 14A where the end of film 1210 closest to the LEDs 1440 is aligned with an end of layer 1420. FIG. 14B shows the film 1210 displaced by a distance 1483b. Hot spot contrast (defined as the ratio of the amplitude of the luminance peak to the amplitude of the luminance valley over each individual measured region) is shown as a function of distance from the edge of the film in FIG. 15. It was found that values below a contrast ratio of 1.8 provided acceptable reduction of the hot spot in commercial smart phones with this combination of upper and lower diffusing films.

Figure 16:
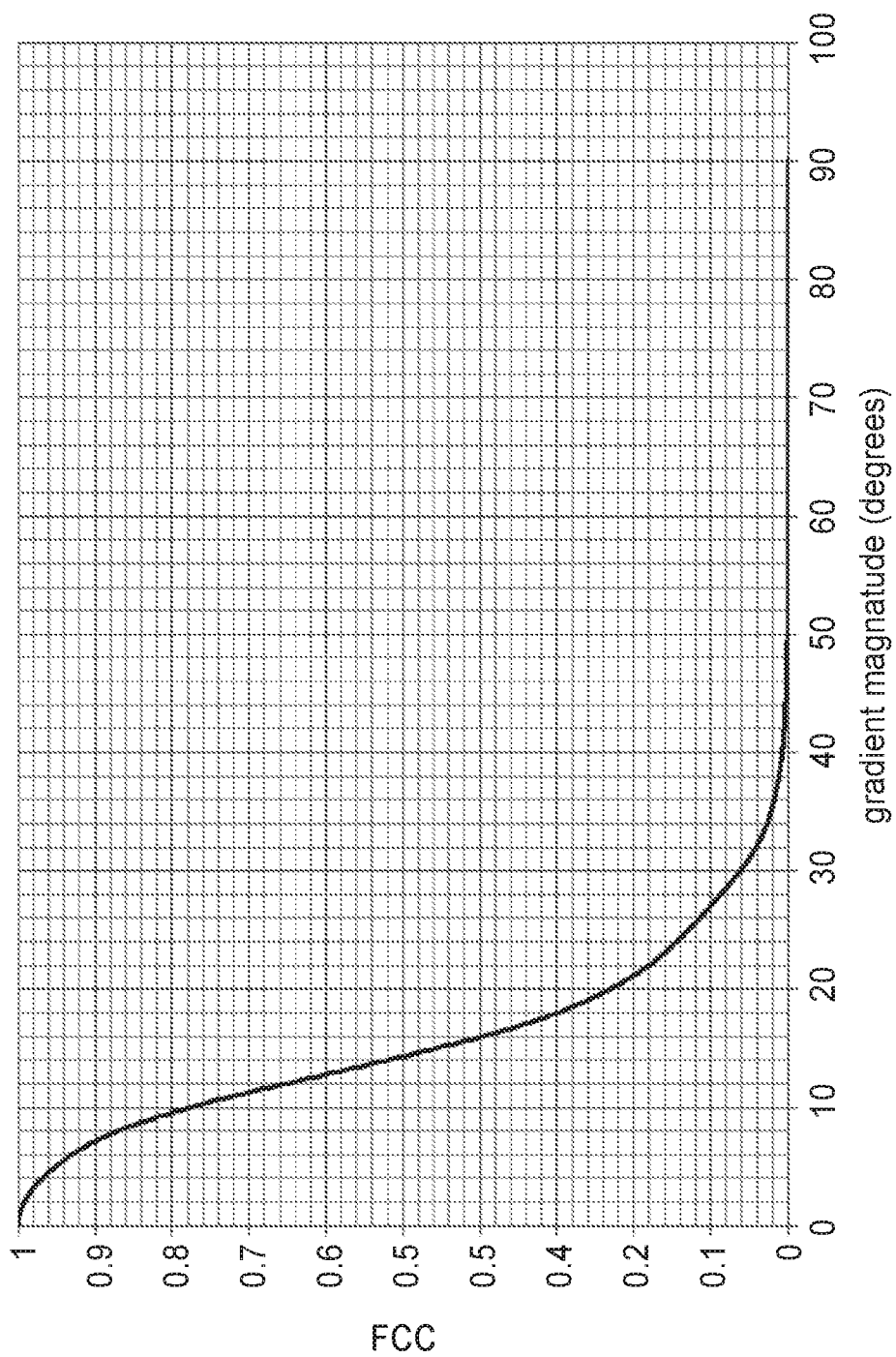
FIG. 16 is a graph of a complement cumulative slope distribution.

Characterization of First Major Surface A structured diffuser film was made as described in WO 2014/081693 (Pham et al.). The structured surface was suitable for use as a first major surface of the diffusers of the present description. The surface was characterized by atomic force microscopy and then analyzed to determine the distribution of surface slopes. The complement cumulative slope distribution (FCC) for the surface is shown in FIG. 16. Complement cumulative slope distribution functions are described, for example, in U.S. Pat. App. Pub. No. 2012/0064296 (Walker et al.) which is hereby incorporated herein by reference to the extent that it does not contradict the present description. For each slope value on the x-axis, the y-value indicates the fraction of slopes that are greater than that value.

The following is a list of exemplary embodiments of the present description.

Embodiment 1 is a diffuser comprising opposing first and second major surfaces and an edge extending between the first and second major surfaces, wherein the first major surface comprises a first plurality of surface structures providing a substantially uniform first haze, the second major surface comprises a first portion adjacent the edge and a second portion adjacent the first portion opposite the edge, the first portion includes a first region adjacent the edge and a second region between the first region and the second portion, wherein the second major surface comprises a second plurality of surface structures providing a substantially uniform second haze over the second portion of the second major surface and providing a third haze in the first portion of the second major surface, wherein the third haze is substantially equal to the second haze along a continuous boundary between the first and second portions of the second major surface, wherein the third haze in the first region is higher than the second haze, and the third haze in the second region monotonically decreases with a distance along a direction from the edge towards the continuous boundary, and wherein the second portion has a surface area of at least 90 percent of a surface area of the second major surface.

Embodiment 2 is the diffuser of embodiment 1, wherein the third haze in the first region is substantially independent of the distance along the direction from the first edge towards the continuous boundary.

Embodiment 3 is the diffuser of embodiment 1, wherein the second region has a width of at least 1 mm.

Embodiment 4 is the diffuser of embodiment 1, wherein the third haze depends on a distance along an in-plane direction orthogonal to the direction from the first edge towards the continuous boundary.

Embodiment 5 is the diffuser of embodiment 1, wherein the third haze is substantially independent of a distance along an in-plane direction orthogonal to the direction from the first edge towards the continuous boundary.

Embodiment 6 is the diffuser of embodiment 1, wherein a difference in magnitude between the third haze at a first position and the third haze at a second position for each pair of first and second positions separated by no more than 0.1 mm is less than 10 percent.

Embodiment 7 is the diffuser of embodiment 1, wherein the diffuser has a length along the edge and a width in an orthogonal in-plane direction, and wherein a width of the second portion is at least 90 percent of the width of the diffuser, each of the first and second portions and the first and second regions extend along at least 90 percent of the length of the diffuser, the first region is immediately adjacent the edge, the second region is immediately adjacent the first region, and the second portion is immediately adjacent the second region.

Embodiment 8 is the diffuser of embodiment 1, wherein the first plurality of surface structures comprise closely-packed structures arranged such that ridges are formed between adjacent structures, the structures being limited in size along two orthogonal in-plane directions.

Embodiment 9 is the diffuser of embodiment 8, wherein the first major surface has a topography characterizable by a first and second Fourier power spectrum associated with respective first and second orthogonal in-plane directions, and wherein to the extent the first Fourier power spectrum includes one or more first frequency peaks not corresponding to zero frequency and being bounded by two adjacent valleys that define a first baseline, any such first frequency peak has a first peak ratio of less than 0.8, the first peak ratio being equal to an area between the first frequency peak and the first baseline divided by an area beneath the first frequency peak; and to the extent the second Fourier power spectrum includes one or more second frequency peaks not corresponding to zero frequency and being bounded by two adjacent valleys that define a second baseline, any such second frequency peak has a second peak ratio of less than 0.8, the second peak ratio being equal to an area between the second frequency peak and the second baseline divided by an area beneath the second frequency peak.

Embodiment 10 is the diffuser of embodiment 9, wherein the first major surface is characterized by a total ridge length per unit area in plan view of less than 200 mm/mm$^2$.

Embodiment 11 is the diffuser of embodiment 9, wherein the closely-packed structures are characterized by equivalent circular diameters (ECDs) in a reference plane and mean heights along a thickness direction, and wherein an aspect ratio of each structure equals the mean height of the structure divided by the ECD of the structure; and wherein an average aspect ratio of the structures is less than 0.15.

Embodiment 12 is the diffuser of embodiment 1, wherein the first haze is greater than the second haze.

Embodiment 13 is the diffuser of embodiment 1, wherein the first haze is in a range of 10 percent to 100 percent.

Embodiment 14 is the diffuser of embodiment 13, wherein the first haze is in a range of 70 percent to 100 percent.

Embodiment 15 is the diffuser of embodiment 1, wherein the second haze is in a range from about 0.5 percent to about 95 percent.

Embodiment 16 is the diffuser of embodiment 1, wherein the second haze is in a range from about 1 percent to about 70 percent.

Embodiment 17 is the diffuser of embodiment 1, wherein the third haze has a maximum of at least 60 percent.

Embodiment 18 is the diffuser of embodiment 1, wherein the first haze is greater than the second haze and the third haze has a maximum that is greater than the first haze.

Embodiment 19 is the diffuser of embodiment 18, wherein the first haze is greater than the second haze by at least 2 percent and the maximum is greater than the first haze by at least 2 percent.

Embodiment 20 is the diffuser of embodiment 18, wherein the first haze is greater than the second haze by at least 10 percent and the maximum is greater than the first haze by at least 10 percent.

Embodiment 21 is the diffuser of embodiment 1, wherein no more than about 10 percent of the second portion of the second major surface has a slope magnitude that is greater than about 40 degrees.

Embodiment 22 is the diffuser of embodiment 1, wherein no more than about 10 percent of the second portion of the second major surface has a slope magnitude that is greater than about 30 degrees.

Embodiment 23 is the diffuser of embodiment 1, wherein no more than about 7 percent of the second portion of the second major surface has a slope magnitude that is greater than about 30 degrees.

Embodiment 24 is the diffuser of embodiment 1, wherein no more than about 7 percent of the second portion of the second major surface has a slope magnitude that is greater than about 20 degrees.

Embodiment 25 is the diffuser of embodiment 1, wherein no more than about 7 percent of the second portion of the second major surface has a slope magnitude that is greater than about 10 degrees.

Embodiment 26 is the diffuser of embodiment 1, wherein no more than about 85 percent of the second portion of the second major surface has a slope magnitude that is greater than about 10 degrees.

Embodiment 27 is the diffuser of embodiment 1, wherein no more than about 80 percent of the second portion of the second major surface has a slope magnitude that is greater than about 10 degrees.

Embodiment 28 is the diffuser of any of embodiments 21 to 27, wherein at least 50 percent of the second portion of the second major surface has a slope magnitude that is greater than about 1 degree.

Embodiment 29 is the diffuser of any of embodiments 21 to 27, wherein at least about 80 percent of the second portion of the second major surface has a slope magnitude that is greater than about 1 degree.

Embodiment 30 is the diffuser of any of embodiments 21 to 27, wherein at least about 85 percent of the second portion of the second major surface has a slope magnitude that is greater than about 1 degree.

Embodiment 31 is the diffuser of any of embodiments 21 to 27, wherein at least about 90 percent of the second portion of the second major surface has a slope magnitude that is greater than about 1 degree.

Embodiment 32 is the diffuser of embodiment 1, wherein the second region of the first portion of the second major surface has a slope distribution that varies substantially continuously with the distance along the direction from the first edge towards the continuous boundary.

Embodiment 33 is the diffuser of embodiment 1, wherein at least one area in the first portion of the second major surface or in the second portion of the second major surface has a first surface angle distribution having a first half width at half maximum (HWHM) in a first direction and a second surface angle distribution having a second HWHM in a second direction different from the first direction, wherein the first HWHM is different from the second HWHM.

Embodiment 34 is the diffuser of embodiment 33, wherein a ratio of the first HWHM to the second HWHM is greater than 1.1 and less than about 10.

Embodiment 35 is the diffuser of embodiment 1, wherein the second major surface includes surface structures having an amplitude distribution and a spacing distribution and wherein at least one of the amplitude and spacing distributions varies in the second region of the first portion of the second major surface and each of the amplitude and spacing distributions are substantially uniform through the second portion of the second major surface.

Embodiment 36 is a display comprising:
a light guide having an input edge and an output major surface; and
the diffuser of embodiment 1 disposed proximate the light guide with the second major surface of the diffuser facing the output major surface of the light guide and with the edge of the diffuser adjacent the input edge of the light guide.

Embodiment 37 is a method of making the diffuser of embodiment 1 comprising:

providing a first microreplication tool having a first structured surface;
providing a substrate having opposite first and second sides; and
using the first microreplication tool to form the first major surface of the diffuser on the first side of the substrate,
wherein the step of providing the first microreplication tool comprises:
   forming a first layer of a metal by electrodepositing the metal using a first electroplating process resulting in a first major surface of the first layer having a first average roughness; and
   forming a second layer of the metal on the first major surface of the first layer by electrodepositing the metal on the first major surface using a second electroplating process resulting in a second major surface of the second layer having a second average roughness smaller than the first average roughness.

Embodiment 38 is the method of embodiment 37, further comprising the step of forming the second major surface of the diffuser on of the second side of the substrate by one or more of offset printing, ink-jet printing, and casting and curing against a second microreplication tool.

Embodiment 39 is the method of embodiment 38, wherein the step of forming the second major surface of the diffuser comprises offset printing or ink-jet printing of clear resin or bead-loaded resin.

Embodiment 40 is the method of embodiment 38, wherein the step of forming the second major surface of the diffuser comprises casting and curing against the second microreplication tool, the method further comprising the step of making the second microreplication tool using a cutting system to cut structures into a surface of a pre-formed tool.

Embodiment 41 is a method of making a diffuser comprising:
providing a first microreplication tool having a first structured surface, the first structured surface having a substantially uniform distribution of surface structures;
providing a substrate having opposing first and second major surfaces;
using the first microreplication tool to structure the first major surface of the substrate;
providing a second microreplication tool having a second structured surface, the second structured surface having a distribution of surface structures that varies in a region of a first portion of the second structured surface and is substantially uniform over a second portion of the second structured surface, and wherein the second portion has a surface area of at least 90 percent of a surface area of the second structured surface;
using the second microreplication tool to structure the second major surface of the substrate;
wherein the step of providing the first microreplication tool comprises:
   forming a first layer of a metal by electrodepositing the metal using a first electroplating process resulting in a first major surface of the first layer having a first average roughness; and
   forming a second layer of the metal on the first major surface of the first layer by electrodepositing the metal on the first major surface using a second electroplating process resulting in a second major surface of the second layer having a second average roughness smaller than the first average roughness; and
wherein the step of providing the second microreplication tool comprises using a cutting system to cut structures into a surface of a pre-formed tool.

Embodiment 42 is the method of embodiment 41, wherein using the first microreplication tool to structure the first major surface of the substrate comprises casting and curing a resin against the first microreplication tool.

Embodiment 43 is the method of embodiment 41, wherein using the second microreplication tool to structure the second major surface of the substrate comprises casting and curing a resin against the second microreplication tool.

Embodiment 44 is the method of embodiment 41, wherein at least one area in the first portion of the second structured surface or in the second portion of the second structured surface has a first surface angle distribution having a first half width at half maximum (HWHM) in a first direction and a second surface angle distribution having a second HWHM in a second direction different from the first direction, wherein the first HWHM is different from the second HWHM.

Embodiment 45 is an optical stack comprising:
an optical film comprising:
   a structured top surface comprising a plurality of substantially parallel top structures extending linearly along a first direction; and
   a structured bottom surface comprising a plurality of substantially parallel bottom structures extending linearly along a second direction different from the first direction, each top and bottom structure comprising opposing first and second curved faces extending from respective opposite first and second ends of a base of the structure and meeting at a peak of the structure; and
an optical diffuser substantially coextensive with the optical film and comprising:
   a structured top surface facing the structured bottom surface of the optical film and having a substantially uniform first optical haze across the structured top surface; and
   a structured bottom surface having a first portion along a first edge of the structured bottom surface and a second portion extending from the first portion to an opposite second edge of the structured bottom surface, the second portion having a substantially uniform second optical haze across the second portion, at least some regions in the first portion having a third optical haze no less than the first optical haze, the second optical haze being less than the first optical haze.

Embodiment 46 is the optical stack of embodiment 45, wherein the optical film and the optical diffuser are bonded together along corresponding edges thereof to form an air gap between the optical film and the optical diffuser.

Embodiment 47 is the optical stack of embodiment 45, wherein each of the structured top and bottom surface comprises a plurality of substantially randomly arranged structures.

Embodiment 48 is the optical stack of embodiment 45, wherein the first optical haze is greater than about 70%, the second optical haze is greater than about 95%, and the third optical haze is less than about 70%.

Embodiment 49 is a backlight comprising:
a light source;
a lightguide having an input surface proximate the light source and an output surface;
an optical diffuser disposed on the lightguide and comprising:
   a structured top surface having a substantially uniform first optical haze across the structured top surface; and
   a structured bottom surface facing the output surface of the lightguide and having a first portion along a first edge of the structured bottom surface proximate the input surface of the lightguide and a second portion extending from the first portion to an opposite second edge of the structured bottom surface, the second portion having a substantially uniform second optical haze across the second portion, at least some regions in the first portion having a third optical haze no less than the first optical haze, the second optical haze being different from the first optical haze; and an optical film disposed on the optical diffuser and comprising:
   a first structured surface comprising a plurality of substantially linear parallel first structures facing the structured top surface of the optical diffuser;
   a second structured surface comprising a plurality of substantially linear parallel second structures facing away from the structured top surface of the optical diffuser, each first and second structure comprising opposing curved first and second faces, the curved first and second faces having different axes of curvature.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A diffuser comprising opposing first and second major surfaces and an edge extending between the first and second major surfaces, wherein the first major surface comprises a first plurality of surface structures providing a substantially uniform first haze, the second major surface comprises a first portion adjacent the edge and a second portion adjacent the first portion opposite the edge, the first portion includes a first region adjacent the edge and a second region between the first region and the second portion, wherein the second major surface comprises a second plurality of surface structures providing a substantially uniform second haze over the second portion of the second major surface and providing a third haze in the first portion of the second major surface, wherein the third haze is substantially equal to the second haze along a continuous boundary between the first and second portions of the second major surface, wherein the third haze in the first region is higher than the second haze, and the third haze in the second region monotonically decreases with a distance along a direction from the edge towards the continuous boundary, wherein the second portion has a surface area of at least 90 percent of a surface area of the second major surface, and wherein the second region of the first portion of the second major surface has a slope distribution that varies substantially continuously with the distance along the direction from the edge towards the continous boundary.

2. The diffuser of claim 1, wherein the diffuser has a length along the edge and a width in an orthogonal in-plane direction, and wherein a width of the second portion is at least 90 percent of the width of the diffuser, each of the first and second portions and the first and second regions extend along at least 90 percent of the length of the diffuser, the first region is immediately adjacent the edge, the second region is immediately adjacent the first region, and the second portion is immediately adjacent the second region.

3. The diffuser of claim 1, wherein the first plurality of surface structures comprise closely-packed structures arranged such that ridges are formed between adjacent structures, the structures being limited in size along two orthogonal in-plane directions.

4. The diffuser of claim 3, wherein the first major surface has a topography characterizable by a first and second Fourier power spectrum associated with respective first and second orthogonal in-plane directions, and wherein
   to the extent that the first Fourier power spectrum includes one or more first frequency peaks not corresponding to zero frequency and being bounded by two adjacent valleys that define a first baseline, any such first frequency peak has a first peak ratio of less than 0.8, the first peak ratio being equal to an area between the first frequency peak and the first baseline divided by an area beneath the first frequency peak; and
   to the extent that the second Fourier power spectrum includes one or more second frequency peaks not corresponding to zero frequency and being bounded by two adjacent valleys that define a second baseline, any such second frequency peak has a second peak ratio of less than 0.8, the second peak ratio being equal to an area between the second frequency peak and the second baseline divided by an area beneath the second frequency peak.

5. The diffuser of claim 4, wherein the first major surface is characterized by a total ridge length per unit area in plan view of less than 200 mm/mm$^2$.

6. The diffuser of claim 4, wherein the closely-packed structures are characterized by equivalent circular diameters (ECDs) in a reference plane and mean heights along a thickness direction, and wherein an aspect ratio of each structure equals the mean height of the structure divided by the ECD of the structure; and wherein an average aspect ratio of the structures is less than 0.15.

7. The diffuser of claim 1, wherein the third haze has a maximum of at least 60 percent.

8. The diffuser of claim 1, wherein the first haze is greater than the second haze and the third haze has a maximum that is greater than the first haze.

9. The diffuser of claim 1, wherein no more than about 10 percent of the second portion of the second major surface has a slope magnitude that is greater than about 40 degrees.

10. The diffuser of claim 1, wherein at least one area in the first portion of the second major surface or in the second portion of the second major surface has a first surface angle distribution having a first half width at half maximum (HWHM) in a first direction and a second surface angle distribution having a second HWHM in a second direction different from the first direction, wherein the first HWHM is different from the second HWHM.

11. The diffuser of claim 10, wherein a ratio of the first HWHM to the second HWHM is greater than 1.1 and less than 10.

12. The diffuser of claim 1, wherein the second major surface includes surface structures having an amplitude distribution and a spacing distribution and wherein at least one of the amplitude and spacing distributions varies in the second region of the first portion of the second major surface and each of the amplitude and spacing distributions are substantially uniform through the second portion of the second major surface.

13. A display comprising:
   a light guide having an input edge and an output major surface; and
   the diffuser of claim 1 disposed proximate the light guide with the second major surface of the diffuser facing the output major surface of the light guide and with the edge of the diffuser adjacent the input edge of the light guide.

14. A method of making the diffuser of claim 1 comprising:
providing a first microreplication tool having a first structured surface;
providing a substrate having opposite first and second sides; and
using the first microreplication tool to form the first major surface of the diffuser on the first side of the substrate,
wherein the step of providing the first microreplication tool comprises:
forming a first layer of a metal by electrodepositing the metal using a first electroplating process resulting in a first major surface of the first layer having a first average roughness; and
forming a second layer of the metal on the first major surface of the first layer by electrodepositing the metal on the first major surface of the first layer using a second electroplating process resulting in a second major surface of the second layer having a second average roughness smaller than the first average roughness.

15. The diffuser of claim 1, wherein a difference in magnitude between the third haze at a first position and the third haze at a second position for each pair of first and second positions separated by no more than 0.1 mm is less than 10 percent.

16. An optical stack comprising:
an optical film comprising:
a structured top surface comprising a plurality of substantially parallel top structures extending linearly along a first direction; and
a structured bottom surface comprising a plurality of substantially parallel bottom structures extending linearly along a second direction different from the first direction, each top and bottom structure comprising opposing first and second curved faces extending from respective opposite first and second ends of a base of the structure and meeting at a peak of the structure; and
an optical diffuser substantially coextensive with the optical film and comprising:
a structured top surface facing the structured bottom surface of the optical film and having a substantially uniform first optical haze across the structured top surface; and
a structured bottom surface having a first portion along a first edge of the structured bottom surface of the optical diffuser and a second portion extending from the first portion to an opposite second edge of the structured bottom surface, the second portion having a substantially uniform second optical haze across the second portion, the second portion having a surface area of at least 90 percent of a surface area of the structured bottom surface of the optical diffuser, at least some regions in the first portion having a third optical haze no less than the first optical haze, the second optical haze being less than the first optical haze.

17. The optical stack of claim 16, wherein the optical film and the optical diffuser are bonded together along corresponding edges thereof to form an air gap between the optical film and the optical diffuser.

18. The optical stack of claim 16, wherein the first optical haze is greater than 70%, the third optical haze is greater than 95%, and the second optical haze is less than 70%.

19. A backlight comprising:
a light source;
a lightguide having an input surface proximate the light source and an output surface;
an optical diffuser disposed on the lightguide and comprising:
a structured top surface having a substantially uniform first optical haze across the structured top surface; and
a structured bottom surface facing the output surface of the lightguide and having a first portion along a first edge of the structured bottom surface proximate the input surface of the lightguide and a second portion extending from the first portion to an opposite second edge of the structured bottom surface, the second portion having a substantially uniform second optical haze across the second portion, the second portion having a surface area of at least 90 percent of a surface area of the structured bottom surface, at least some regions in the first portion having a third optical haze no less than the first optical haze, the second optical haze being different from the first and third optical hazes; and
an optical film disposed on the optical diffuser and comprising:
a first structured surface comprising a plurality of substantially linear parallel first structures facing the structured top surface of the optical diffuser;
a second structured surface comprising a plurality of substantially linear parallel second structures facing away from the structured top surface of the optical diffuser, each first and second structure comprising opposing curved first and second faces, the curved first and second faces having different axes of curvature.

* * * * *

UNITED STATES PATENT AND TRADEMARK OFFICE
CERTIFICATE OF CORRECTION

PATENT NO. : 10,698,138 B2
APPLICATION NO. : 15/568832
DATED : June 30, 2020
INVENTOR(S) : Gary Boyd Page 1 of 1

It is certified that error appears in the above-identified patent and that said Letters Patent is hereby corrected as shown below:

In the Claims

Column 35
Line 56, in Claim 1, delete "continous" and insert -- continuous --, therefor.

Signed and Sealed this
Twenty-fifth Day of August, 2020

Andrei Iancu
*Director of the United States Patent and Trademark Office*